US00RE38092E

(19) United States
(12) Reissued Patent
Yamada et al.

(10) Patent Number: US RE38,092 E
(45) Date of Reissued Patent: Apr. 29, 2003

(54) IMAGE FORMING APPARATUS

(75) Inventors: Takahisa Yamada, Tokyo (JP); Yukitaka Kumagai, Iruma (JP)

(73) Assignee: Olympus Optical Co., Ltd., Tokyo (JP)

(21) Appl. No.: 09/715,729

(22) Filed: Nov. 17, 2000

Related U.S. Patent Documents

Reissue of:
(64) Patent No.: 5,838,354
Issued: Nov. 17, 1998
Appl. No.: 08/652,926
Filed: May 24, 1996

(30) Foreign Application Priority Data

May 31, 1995 (JP) ..... 7-133479
Apr. 23, 1996 (JP) ..... 8-101246

(51) Int. Cl.[7] ..... B41J 2/01
(52) U.S. Cl. ..... 347/101; 347/104; 242/530.4; 242/542
(58) Field of Search ..... 347/104, 101, 347/1; 226/108, 109, 112, 189; 355/311; 242/530.4, 542, 542.4, 594.2, 564.5, 564.3, 562, 562.1, 563, 563.2, 564, 564.1

(56) References Cited

U.S. PATENT DOCUMENTS 4,849,824 A * 7/1989 Sakuragi et al. ..... 358/296
4,992,805 A * 2/1991 Yoshizawa et al. ..... 346/134
5,124,728 A * 6/1992 Denda ..... 346/134
5,511,744 A * 4/1996 Abe et al. ..... 242/564.5
5,627,570 A * 5/1997 Hiramatsu et al. ..... 347/19

* cited by examiner

*Primary Examiner*—John Barlow
*Assistant Examiner*—Juanita Stephens
(74) *Attorney, Agent, or Firm*—Frishauf, Holtz, Goodman & Chick, P.C.

(57) ABSTRACT

An image forming apparatus includes a paper feed station from which sheets can be fed from a plurality of roll sheets only by placing the roll sheets in the station, a recording station for recording desired images on the sheets, and a processing station for delivering the sheets on which the images are recorded. The recording station includes a platen roller and a driving pinch roller for pushing and conveying a fed sheet while the sheet is drawn by suction by a suction chamber, a carriage unit for recording an image on the sheet on the suction chamber while moving along the sheet, and a pair of paper delivery rollers for delivering the sheet on which the image is recorded. The processing station includes a table on which the delivered sheets can be sequentially stacked in a predetermined position, and a biasing spring for biasing the pivotal distal end portion of the table.

50 Claims, 23 Drawing Sheets

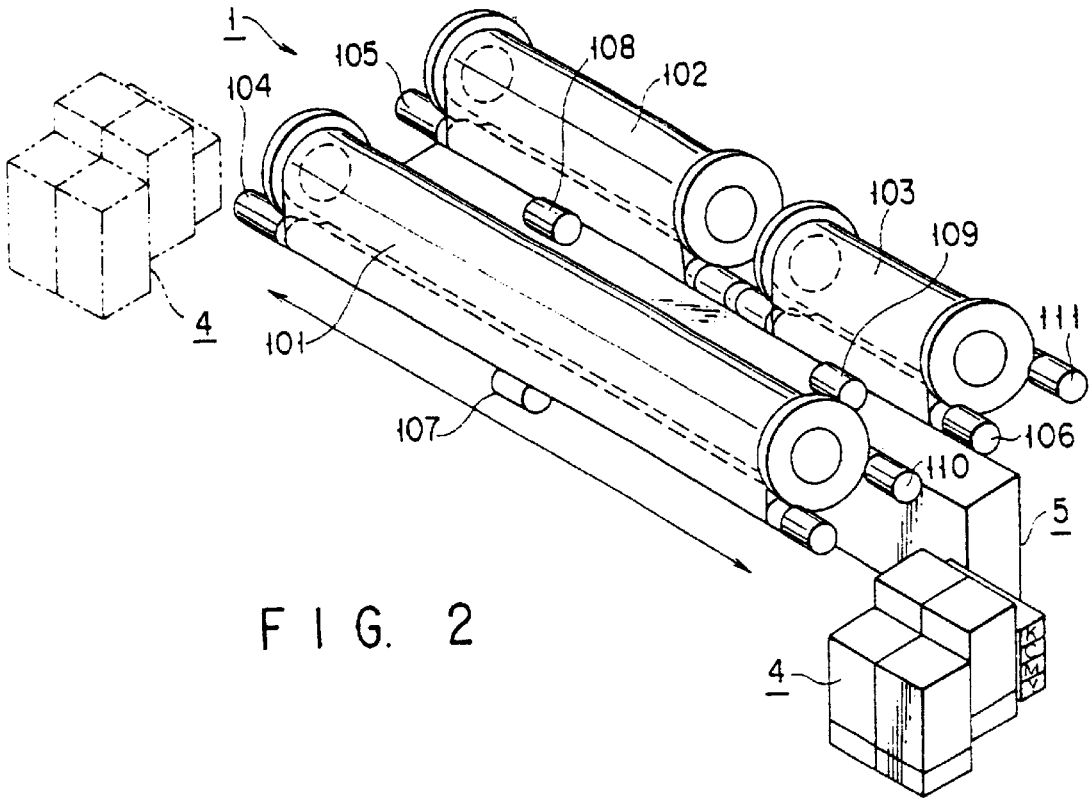
FIG. 2
FIG. 3A
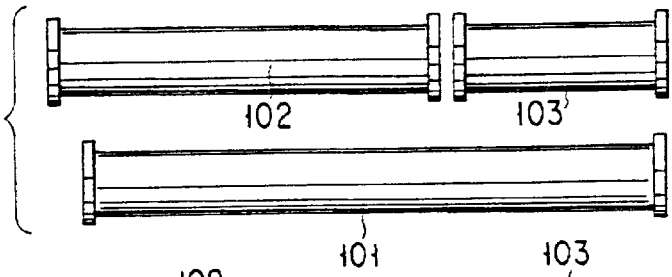
FIG. 3B
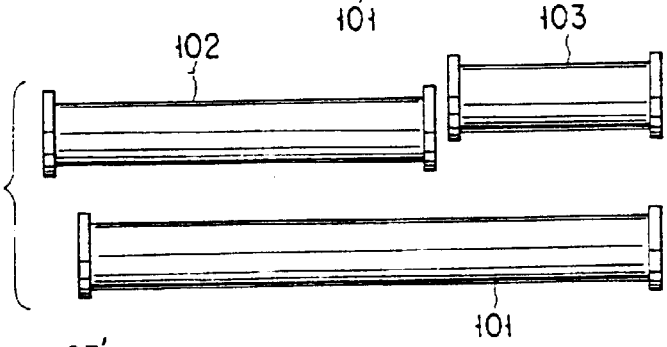
FIG. 3C
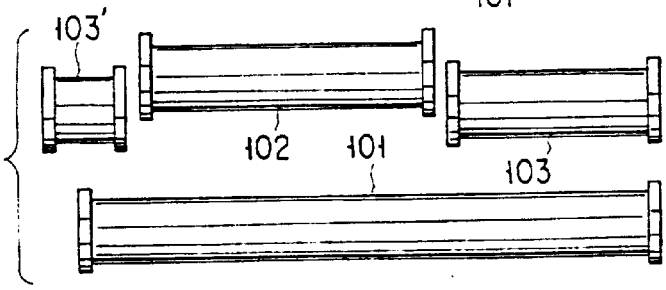

IMAGE FORMING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an image forming apparatus applied to, e.g., a printer or a plotter, which is capable of continuously recording a desired image on sheets of various sizes.

2. Description of the Related Art

Conventionally, the following two methods are known as methods of forming images on sheets of various sizes (e.g., sheets of A sizes such as A4, A3, A2, A1, and A0).

The first method is to set only an A0-size sheet roll (which is formed by winding an A0-size sheet into a roll) in an image forming apparatus and cut the sheet into a desired size after an image is formed. The second method is to set a plurality of sheet rolls of various sizes in an image forming apparatus and cut each sheet into a desired length after an image is formed.

To form desired images on sheets of various sizes from A4 to A0 by using these methods, three sheet rolls with different widths are necessary. More specifically, a 297-mm wide sheet roll corresponds to A4 and A3 sizes, a 594-mm wide sheet roll corresponds to an A2 size, and a 841-mm wide sheet roll corresponds to A1 and A0 sizes. Assuming the length of one sheet roll is 150 m, an A0-size sheet roll generally has a weight of about 10 kg.

To be able to mount these three sheet rolls, in conventional image forming apparatuses three drawer trays are provided in the lower potion or on the operation side of an apparatus. Each drawer tray consists of a holder for holding a sheet roll and a roller for pulling out a sheet from the sheet roll held by the holder.

In conventional image forming apparatuses of the above sort, a desired sheet pulled out by the roller is passed through a sheet path, conveyed to a recording unit by a predetermined conveying means, and subjected to image recording. The sheet on which an image is recorded is cut into a predetermined length by a cutting means arranged downstream in the sheet conveyance direction. Thereafter, the sheet is rewound and the next image recording operation is started.

In these conventional image forming apparatuses, however, a large space is required to arrange the three drawer trays on the operation side, and a large area on the operation side is occupied by these drawer trays. As a consequence, it is necessary to arrange an image-recorded sheet delivery tray on the non-operation side away from the operation side. This makes operations in one direction (operation side) of an apparatus difficult.

Also, when a sheet jam occurs in the conventional image forming apparatuses, it is necessary to pull out the corresponding drawer tray and this is troublesome for a user. Additionally, the sheet may be torn off halfway when the user pulls out the drawer tray. Even when the user can pull out the desired drawer tray, to release the portion where the sheet is nipped he or she must go around to the non-operation side of an apparatus and open a sheet jam management door.

To eliminate these inconveniences, it is possible to equip each drawer tray with a cutting means. However, this increases the dimensions and the cost of an apparatus. Furthermore, if all drawer trays are pulled out, the stability of the apparatus decreases.

To solve these problems, if an apparatus is so designed that all drawer trays cannot be simultaneously pulled out, the operability of the apparatus suffers.

In the conventional image forming apparatuses, a heavy sheet roll is set in the lower drawer tray of an apparatus. This makes the posture which the user takes when mounting the sheet roll unnatural and thereby increases the burden of the user when he or she sets the sheet roll. In addition, the use of drawer trays increases the sheet conveyance distance to the recording unit, and this increases the time required for a sheet to reach the recording unit. Also, a large error appears in the sheet position when the sheet passes through the recording unit.

In the conventional image forming apparatuses, a sheet detecting means detects a plurality of portions on the sides of a sheet while the sheet is slightly moved back and forth, thereby checking whether the sheet is skewed. However, the moving length of a sheet in the conveyance direction is very small compared to the width of the sheet. This makes accurate detection of a skew difficult. In addition, after the skew detection is performed, a recording means moves above the sheet to check whether the dimension in the sheet widthwise direction is appropriate. If the sheet has a slack or the like, therefore, the recording means may contact and damage the sheet in some cases.

In conventional image forming apparatuses using an inkjet recording method, the time required for ink droplets to reach a sheet from a recording head of a recording means varies if the spacing between the recording head and the sheet is not maintained constant. Since a carriage is so controlled as to perform printing while moving, if this variation occurs the positional accuracy with which ink droplets adhere to a sheet decreases.

In the conventional image forming apparatuses, recording is done by using a platen roller or a guide downstream of the platen roller as a platen surface. If the recording width of a recording means is large and a high recording speed is necessary, the radius of curvature of the platen roller cannot be ignored. Accordingly, a platen roller with a large diameter is necessary, with the result that a large space is required to accommodate this platen roller and the size of the apparatus is increased.

When a sheet is supported by the guide downstream of the platen roller, the sheet may sometimes float from the guide. Also, it is difficult to maintain the accuracy of the guide constant throughout the width because of the influence of parts accuracy and thermal expansion by environments. For example, in a method of conveying a sheet by drawing the sheet to a belt by suction, it is difficult to draw the sheet to the belt by suction with no slip because of the influence of inertia of the sheet or the like. There is another problem that the conveyance of the belt is not constant due to slip or the like cause. Furthermore, in a method in which a platen board is formed by drawing a sheet to a suction box by suction, a load is applied on the sheet while the sheet is being conveyed and consequently the sheet sometimes buckles during the conveyance.

When a sheet is also conveyed downstream of the recording unit, image recording cannot be performed until the sheet reaches a conveying means on the downstream side, resulting in a low recording efficiency. Additionally, since a non-recorded portion is formed on the leading edge of a sheet, the effective recording area is restricted.

In image forming apparatuses using a method of performing recording by reciprocating a carriage, if the width of a sheet to be conveyed is small, the time required for the carriage to return at the side portion of the sheet becomes longer than an actual recording time. This makes efficient image recording impossible.

In image forming apparatuses in which recorded sheets are stocked by sorting them in accordance with their sizes by using a sorter or the like device, if sheet sizes are large the space occupied by the sorter itself is increased. This makes the apparatuses of this type inconvenient in actual use. On the other hand, in apparatuses in which sheets are stocked by dropping them into a stocker, lower sheets are smashed to wrinkle by the weights of sheets falling on them.

Also, coated sheets are primarily used as sheets for an inkjet method, and these coated sheets easily form paper dust when cut. A large quantity of dust particles adhere particularly to the cut surface of a coated sheet or a cutter. Consequently, when the sheet is cut or when it is rewound or again fed after being cut, dust particles scatter in an apparatus and adhere to a recording head. When dust particles thus adhere to the recording head, it is no longer possible to normally eject ink. This problem of paper dust is significant in an apparatus having a cutting means above a recording unit.

Moreover, in the conventional image forming apparatuses, the set positions of sheet rolls are determined and hence it is not possible to flexibly change the set positions in accordance with the use condition or the objective of use. For example, it is impossible to set only a large-size sheet and record a large image on the sheet or to change the set position of a small-size sheet roll to a desired position.

SUMMARY OF THE INVENTION

It is an object of the present invention to provide a compact image forming apparatus capable of stably and efficiently conveying a sheet with a simple construction and having a high operability.

It is another object of the present invention to provide an image forming apparatus in which a sheet roll of an arbitrary size can be set in an arbitrary position in accordance with the use condition or the objective of use.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a perspective view showing a state in which first to third roll sheets are set in a paper feed station;

FIGS. 3A to 3C are plan views showing variations of the roll sheets set in the paper feed station;

DETAILED DESCRIPTION OF THE PREFERRED EMBODIMENTS

An image forming apparatus according to the first embodiment of the present invention will be described below with reference to the accompanying drawings. Note that the image forming apparatus of this embodiment is so designed as to be able to record a desired image on a sheet of a predetermined size, and it is possible to use, e.g., recording paper, a sheet of paper, a plastic film, or cloth as the sheet.

The embodiment will be described below by taking an image forming apparatus using a sheet of paper as an image recording sheet as an example.

Figure 1:
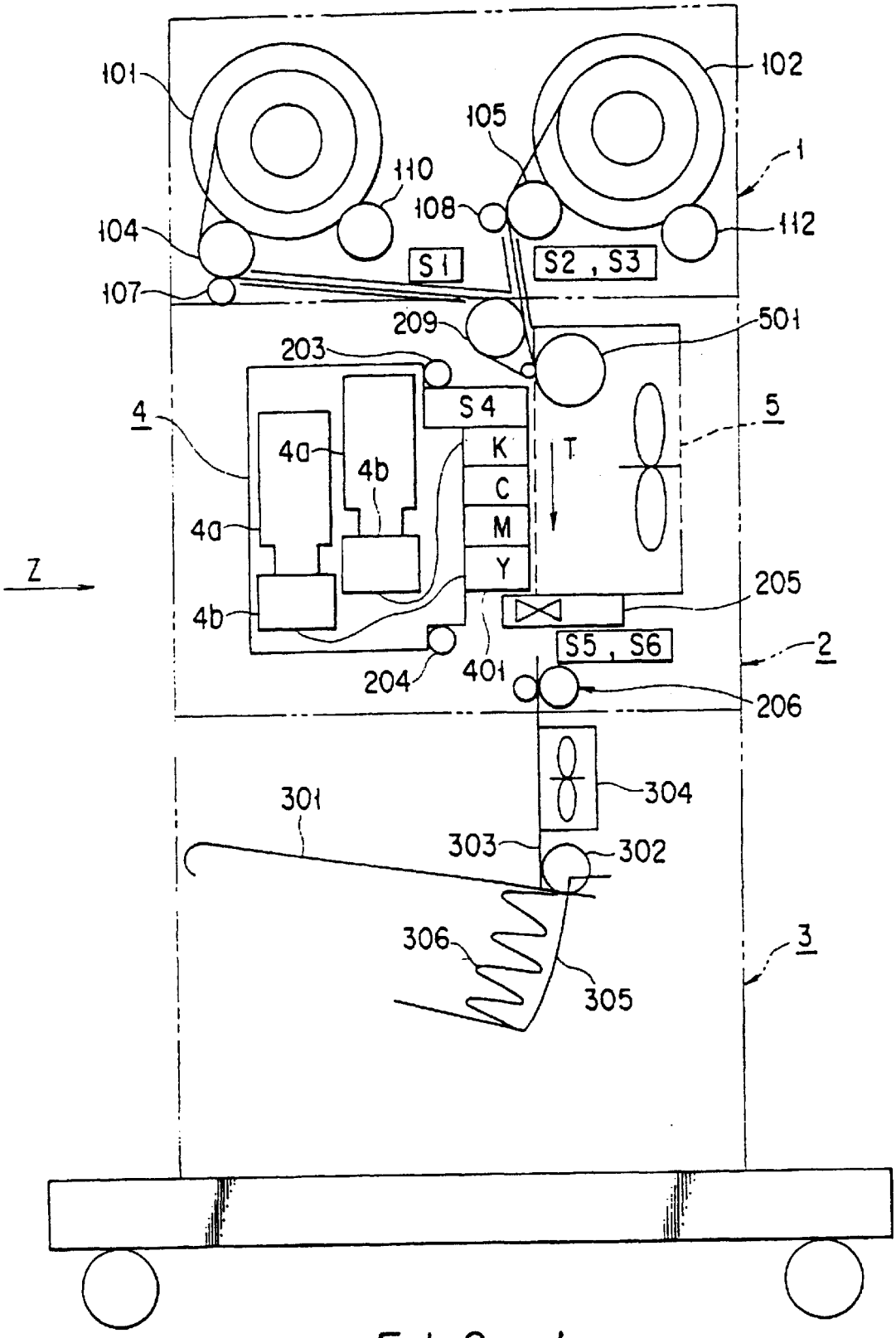
FIG. 1 is a schematic view showing the overall construction of an image forming apparatus according to the first embodiment of the present invention.

As shown in FIG. 1, the image forming apparatus of this embodiment includes a paper feed station 1, a recording station 2, and a processing station 3. The paper feed station 1 can accommodate a plurality of roll sheets each formed by winding a sheet of a predetermined size into a roll (although only two roll sheets 101 and 102 are shown in FIG. 1, this embodiment uses first, second, and third roll sheets 101, 102, and 103 as shown in FIG. 2). The recording station 2 records a desired image on the sheet (101, 102, or 103) fed from the paper feed station 1. The processing station 3 delivers the sheet on which the image is recorded by the recording station 2.

In this embodiment, the first roll sheet 101 is formed by winding a 841-mm wide sheet into a roll, the second roll sheet 102 is formed by winding a 594-mm wide sheet 102 into a roll, and the third roll sheet 103 is formed by winding a 297-mm wide sheet 103 into a roll.

The recording station 2 includes a platen unit 5 and a carriage unit 4. The platen unit 5 is so arranged as to extend in a direction perpendicular to a sheet conveyance direction T. The carriage unit 4 records a desired image on a sheet while moving along the platen unit 5.

Figure 5:
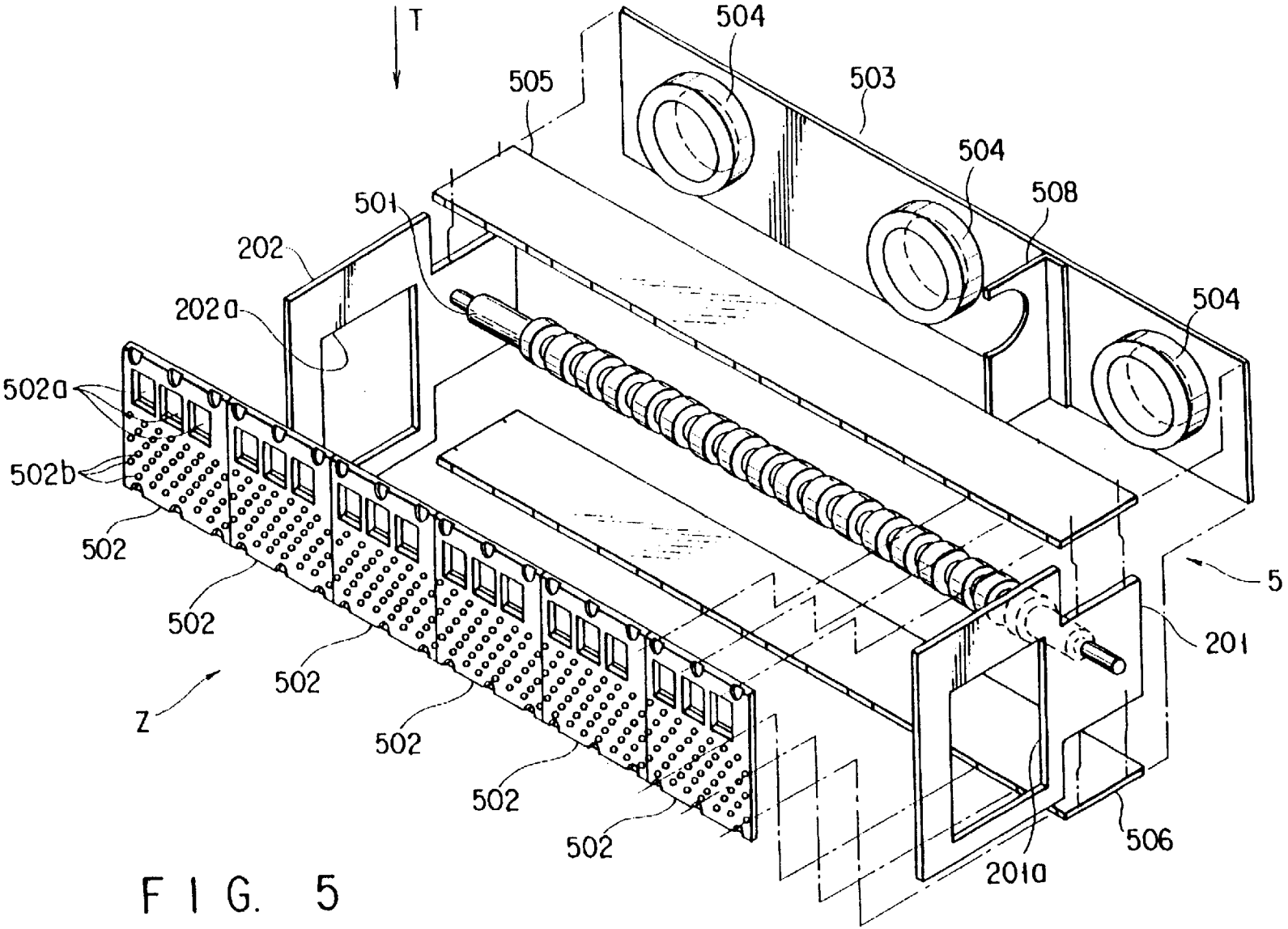
FIG. 5 is an exploded perspective view showing the construction of a suction chamber provided in a recording station.

As shown in FIG. 5, a platen roller 501 is arranged in the direction perpendicular to the sheet conveyance direction T in the platen unit 5 of the recording station 2. This platen roller 501 is rotatably supported by first and second aluminum frames 201 and 202 that oppose each other.

The first and second frames 201 and 202 have positioning notches formed on the upstream and downstream sides in the sheet conveyance direction T. Aluminum upstream and downstream stays 505 and 506 given a high straightness by a milling cutter or a wire cutter are fixed to these positioning notches.

A plurality of aluminum platen boards 502 are fixed to the end faces of these upstream and downstream stays 505 and 506 on an operation side Z to extend in the direction perpendicular to the sheet conveyance direction T. Windows 502a for the platen roller 501 and air suction holes 502b (about 2 mm in diameter) are formed in each platen board 502. Since these platen boards 502 are fixed to the upstream and downstream stays 505 and 506, a high flatness is realized and maintained in the sheet conveyance direction T.

The use of the platen boards 502 can achieve a higher flatness than when a single large platen board is used, and also makes the problem of "warp" difficult to arise.

The platen roller 501 used in this embodiment is a stepped roller. When the platen boards 502 are fixed to the end faces of the upstream and downstream stays 505 and 506 on the operation side Z, the largest outer circumferential portions of the platen roller 501 are exposed from the windows 502a in the platen boards 502. Note that the maximum diameter surface of the platen roller 501 is nearly flush with the surface of the platen board 502 on the operation side Z (i.e., the surface opposing the carriage unit 4) due to the parts accuracies of the first and second frames 201 and 202, the upstream and downstream stays 505 and 506, the platen roller 501, and the platen boards 502.

A cover 503 is attached to the upstream and downstream stays 505 and 506 to oppose the platen boards 502. A plurality of suction means 504 are arranged on the inner surface of the cover 503 (i.e., the surface opposing the platen boards 502).

In the platen unit 5 with the above construction, the platen boards 502, the first and second frames 201 and 202, the upstream and downstream stays 505 and 506, and the cover 503 constitute a suction chamber.

As shown in FIG. 1, the paper feed station 1 is arranged above the recording station 2. As illustrated in FIG. 2, this paper feed station 1 is so designed as to be able to mount the first, second, and third roll sheets 101, 102, and 103.

Figure 4:
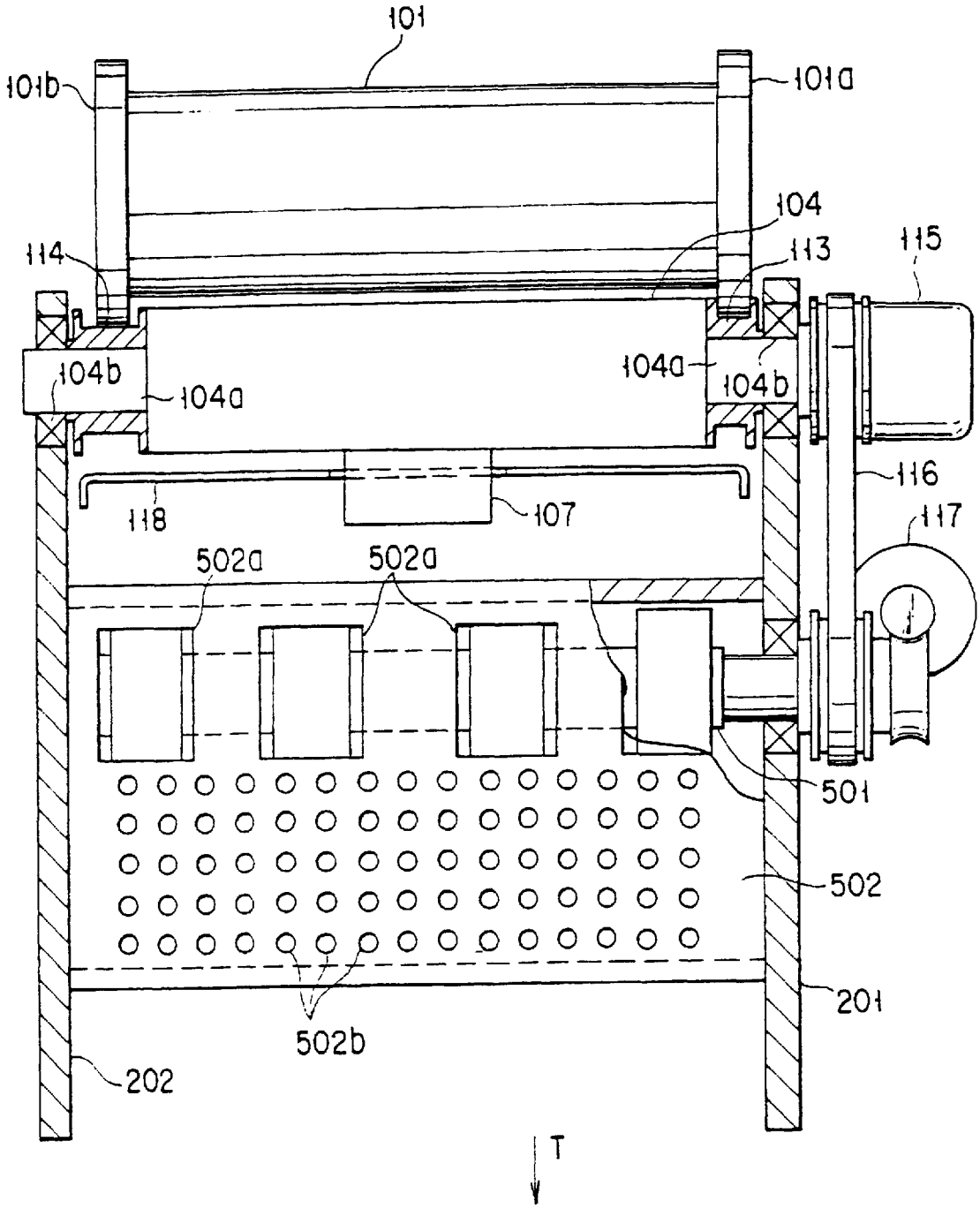
FIG. 4 is a partial sectional view showing a state in which the first roll sheet is set on a first paper feed roller.

More specifically, as illustrated in FIGS. 1, 2, and 4, the first roll sheet 101 is rotatably supported on a first stainless steel paper feed roller 104 and a first stainless steel support roller 110 arranged at a predetermined interval between the first and second frames 201 and 202 (FIG. 4).

The first paper feed roller 104 includes paper feed roller shafts 104a extending from its two ends. These paper feed roller shafts 104a are rotatably supported by the first and second frames 201 and 202 via bearings 104b. Also, sleeves 113 are fitted on the paper feed roller shafts 104a, and the fitting portions have a low friction coefficient.

The first support roller 110 (FIG. 2) has shafts (not shown) protruding from its two ends and is rotatably supported by the first and second frames 201 and 202 via these shafts. Sleeves (not shown) are rotatably fitted on the shafts.

Flanges 101a and 101b are detachably attached to the two ends of the first roll sheet 101. The first roll sheet 101 is rotatably supported on the first paper feed roller 104 and the first support roller 110 by placing these flanges 101a and 101b on the sleeves 113 and 114 of the first paper feed roller 104 and on the sleeves of the first support roller 110.

The sleeve 113 of the first paper feed roller 104 rotatably holds the flange 101a of the first roll sheet 101 and positions the first roll sheet 101 in the widthwise direction. The other sleeve 113 rotatably holds the flange 101b, and the two sleeves of the first support roller 110 rotatably hold the flanges 101a and 101b. To allow smooth sheet conveyance, the outer diameter of each sleeve is made smaller than the outer diameter of the central portion of the first paper feed roller 104.

A pinch roller 107 for nipping the sheet 101 is separably urged against the central portion of the first paper feed roller 104. The first paper feed roller 104 is so treated as to have a high friction coefficient at least on the circumferential surface in this central portion. As this treatment method, it is possible to press rubber into the roller or coat the roller with an aluminum powder. However, a roller which does not easily bend is necessary when the wide sheet 101 is conveyed as in this embodiment. In the method of pressing rubber into the roller, the strength of the roller decreases because the diameter of the roller is reduced by the thickness of the rubber. Therefore, a method in which the roller is coated with an aluminum powder to a thickness of about 150 fm or less is preferred.

A driving belt 116 for transmitting a driving force from a motor 117 arranged outside the first frame 201 is hooked on the paper feed roller shaft 104a of the first paper feed roller 104. The first paper feed roller 104 is rotated in a predetermined direction via a clutch 115. The motor 117 is so designed as to rotate the platen roller 501 in the forward and reverse directions via a worm mechanism. The driving force from the motor 117 is not transmitted to the first support roller 110; that is, the first support roller 110 rotates when the flanges 101a and 101b of the first roll sheet 101 rotate.

As illustrated in FIG. 2, the second and third roll sheets 102 and 103 can be mounted parallel to the first roll sheet 101. More specifically, the second roll sheet 102 is rotatably supported on a second paper feed roller 105 and a second support roller 112 (FIG. 1), and the third roll sheet 103 is rotatably supported on a third paper feed roller 106 and a third support roller 111. Pinch rollers 108 and 109 are separably urged against the central portions of the second and third paper feed rollers 105 and 106, respectively. Accordingly, the second and third paper feed rollers 105 and 106 are so treated as to increase the friction coefficient at least in these central portions. Note that the constructions of the second and third paper feed rollers 105 and 106 and the second and third support rollers 112 and 111 are identical with those of the first paper feed roller 104 and the first support roller 110, and so drawings and descriptions thereof will be omitted.

As illustrated in FIG. 4, the driving force transmitted from the motor 117 to the driving belt 116 via the worm mechanism is selectively transmitted to the second and third paper feed rollers 105 and 106 via the clutch 115. Consequently, the first, second, and third paper feed rollers 104, 105, and 106 can be independently rotated as they are selectively driven by the clutch 115.

The arrow Z shown in FIGS. 1 and 2 indicates the operation side. The first, second, and third paper feed rollers 104, 105, and 106 used in this embodiment are so arranged that the widest and heaviest first roll sheet 101 is positioned close to the operation side Z and the second and third roll sheets 102 and 103 are positioned at the back of the first roll sheets 101. The second and third roll sheets 102 and 103 are arranged parallel to the first roll sheet 101 such that a spacing with which they do not overlap each other in the widthwise direction is kept between them. The first roll sheet 101 overlaps the second and third roll sheets 102 and 103 in the widthwise direction.

FIGS. 3A and 3B illustrate variations of the arrangement, viewed from the above, of the first, second, and third roll sheets 101, 102, and 103 used in this embodiment. As in FIGS. 3A and 3B, the second and third roll sheets 102 and 103 with small widths are arranged parallel to the first roll sheet 101 with the largest width such that they do not overlap each other in the widthwise direction. This makes it possible to arrange a plurality of roll sheets at the same time in a small space. FIG. 3C shows a variation in which a fourth roll sheet 103' is arranged in addition to the first, second, and third roll sheets 101, 102, and 103.

A construction for conveying the sheets 101, 102, and 103 from the first, second, and third roll sheets 101, 102, and 103 to the recording station 2 will be described below with reference to FIGS. 13 and 14.

Figure 13:
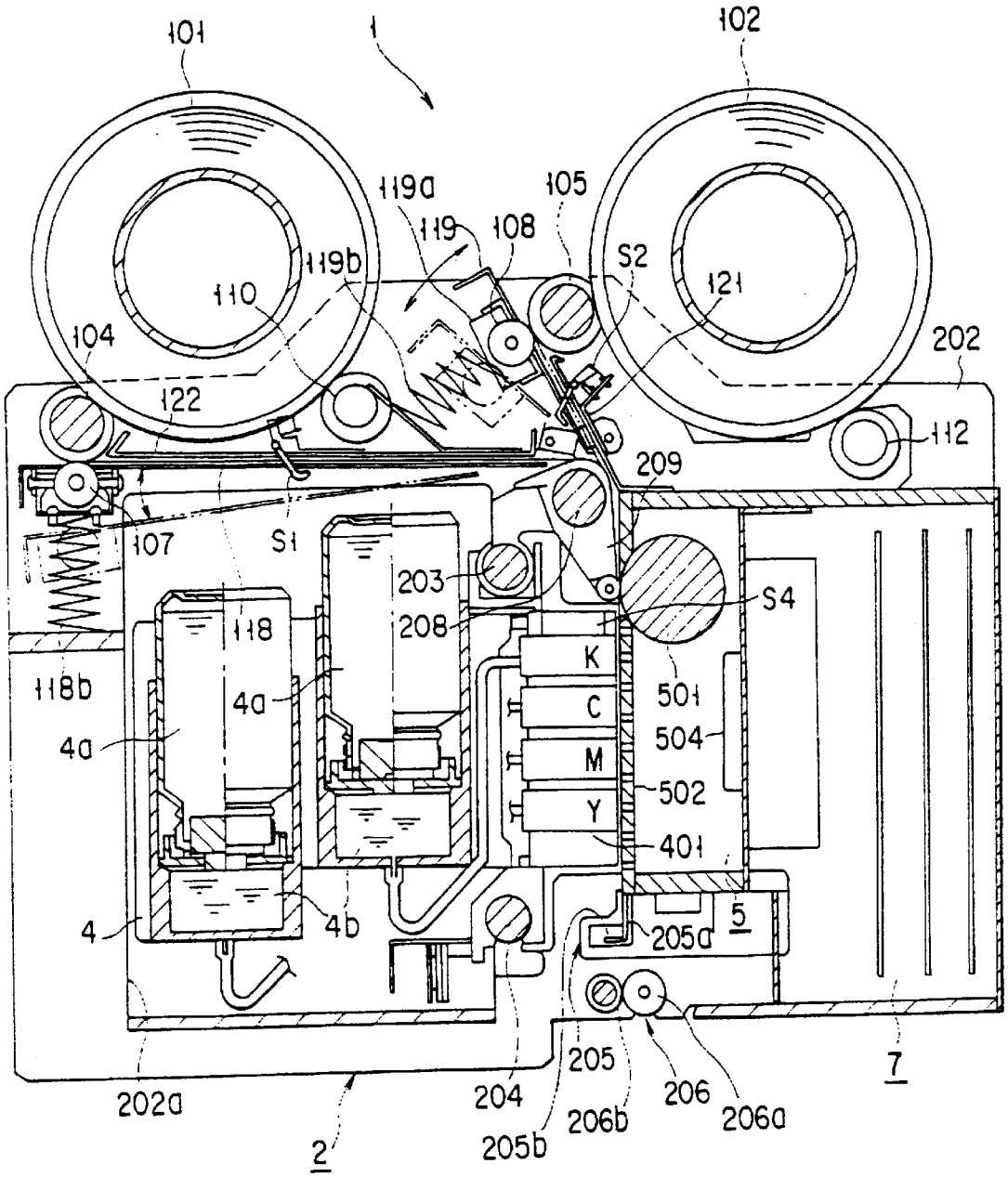
FIG. 13 is a sectional view showing the internal constructions of the paper feed station and the recording station.
Figure 14:
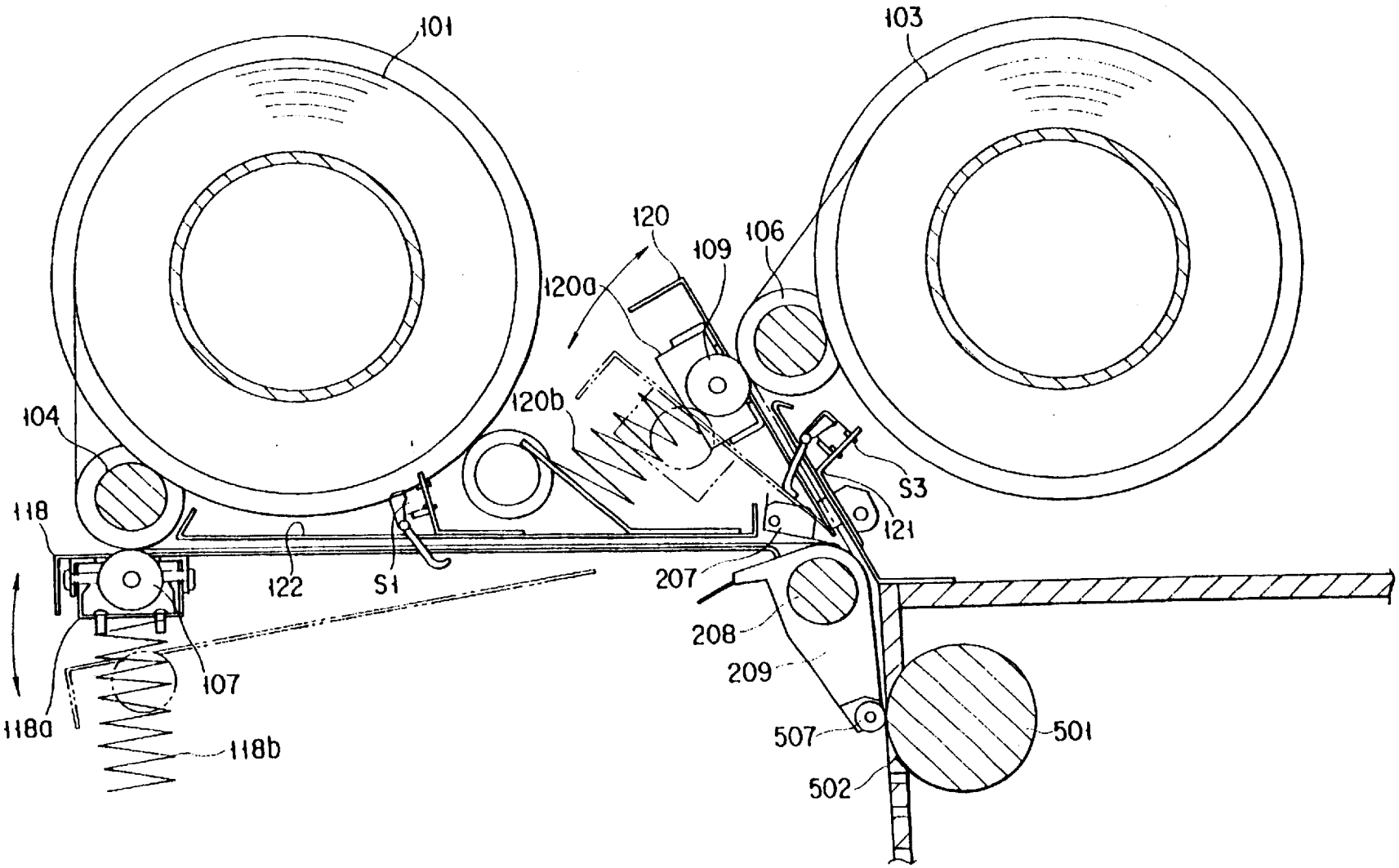
FIG. 14 is a sectional view showing the construction of a portion in which the paper feed station and the recording station joins.

As shown in FIGS. 13 and 14, the pinch rollers 107, 108, and 109 urged against the first, second, and third paper feed rollers 104, 105, and 106 are rotatably held in brackets 118a, 119a, and 120a attached to the rocking distal end portions of rockingly supported first, second, and third movable guides 118, 119, and 120, respectively.

The first, second, and third movable guides 118, 119, and 120 are supported to be rockable in directions perpendicular to the axial directions of the first, second, and third paper feed rollers 104, 105, and 106, respectively, and always biased against their own weights to the fist, second, and third paper feed rollers 104, 105, and 106 by biasing springs 118b, 119b, and 120b arranged near the brackets 118a, 119a, and 120a, respectively. As a consequence, the pinch rollers 107, 108, and 109 are tightly urged against the outer circumferential surfaces of the first, second, and third paper feed rollers 104, 105, and 106, respectively.

With the pinch rollers 107, 108, and 109 being tightly urged against the outer circumferential surfaces of the first, second, and third paper feed rollers 104, 105, and 106, respectively, the first movable guide 118 opposes a first fixed guide 122 fixed to the first and second frames 201 and 202 and thereby forms a first conveyance path (FIG. 4). The second movable guide 119 opposes a second fixed guide 121 fixed to the first and second frames 201 and 202 and thereby forms a second conveyance path. The third movable guide 120 (FIG. 14) opposes the second fixed guide 121 to form a third conveyance path.

The first to third conveyance paths thus formed join at the position of a guide bar 208 held by the first and second frames 201 and 202.

Figure 16:
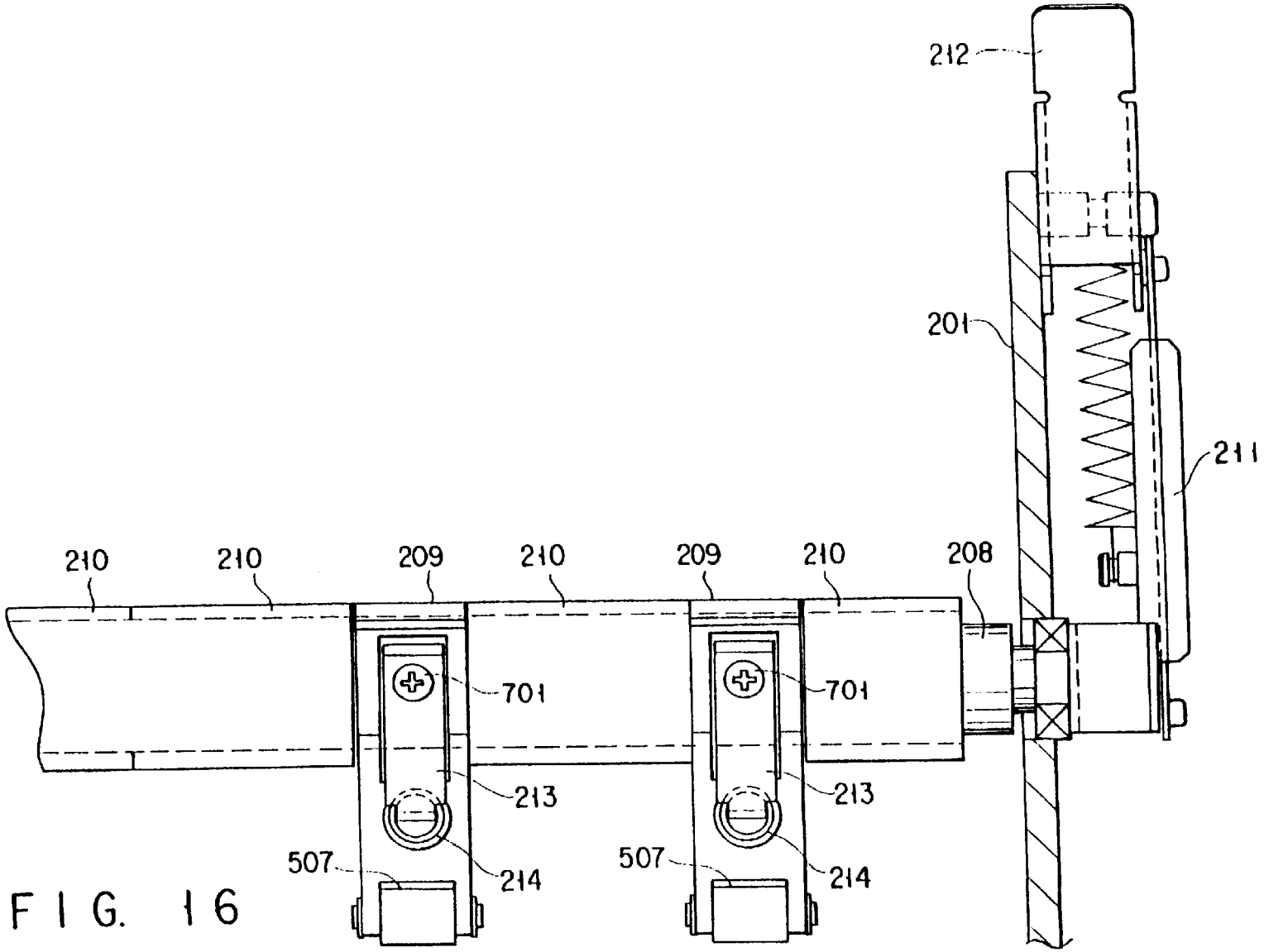
FIG. 16 is a partial sectional view showing a state in which one end of a guide bar arranged near the joint portion is connected to a lever via a link mechanism.

A plurality of pinch holders 209 being rotatable only a predetermined angle are held at predetermined intervals by the guide bar 208. A driving pinch roller 507 (FIG. 14) is rotatably supported by the distal end portion of each pinch holder 209. More specifically, as shown in FIGS. 16 to 18B, each pinch holder 209 is fastened to the guide bar 208 via a metal piece 213. One end portion of the metal piece 213 is inserted into a hole 209a (FIGS. 17, 18A, and 18B) of the pinch holder 209 formed on the side away from each sheet conveyance path. The central portion of the metal piece 213 is fastened to the guide bar 208 by a machine screw 701 (FIGS. 16, 18A, and 18B). One end of each metal piece 213 biases and supports a spring 214 accommodated in the hole 209a of the pinch holder 209, and the other end of the metal piece 213 regulates the range of rotation of the pinch holder 209. Since the movement in the axial direction of each pinch holder 209 is regulated by the metal piece 213, these pinch holders 209 do not move in the axial direction of the guide bar 208.

The guide bar 208 to which the pinch holders 209 are thus attached is connected to a lever 212 via a link mechanism 211 arranged outside the first frame 201.

Figure 17:
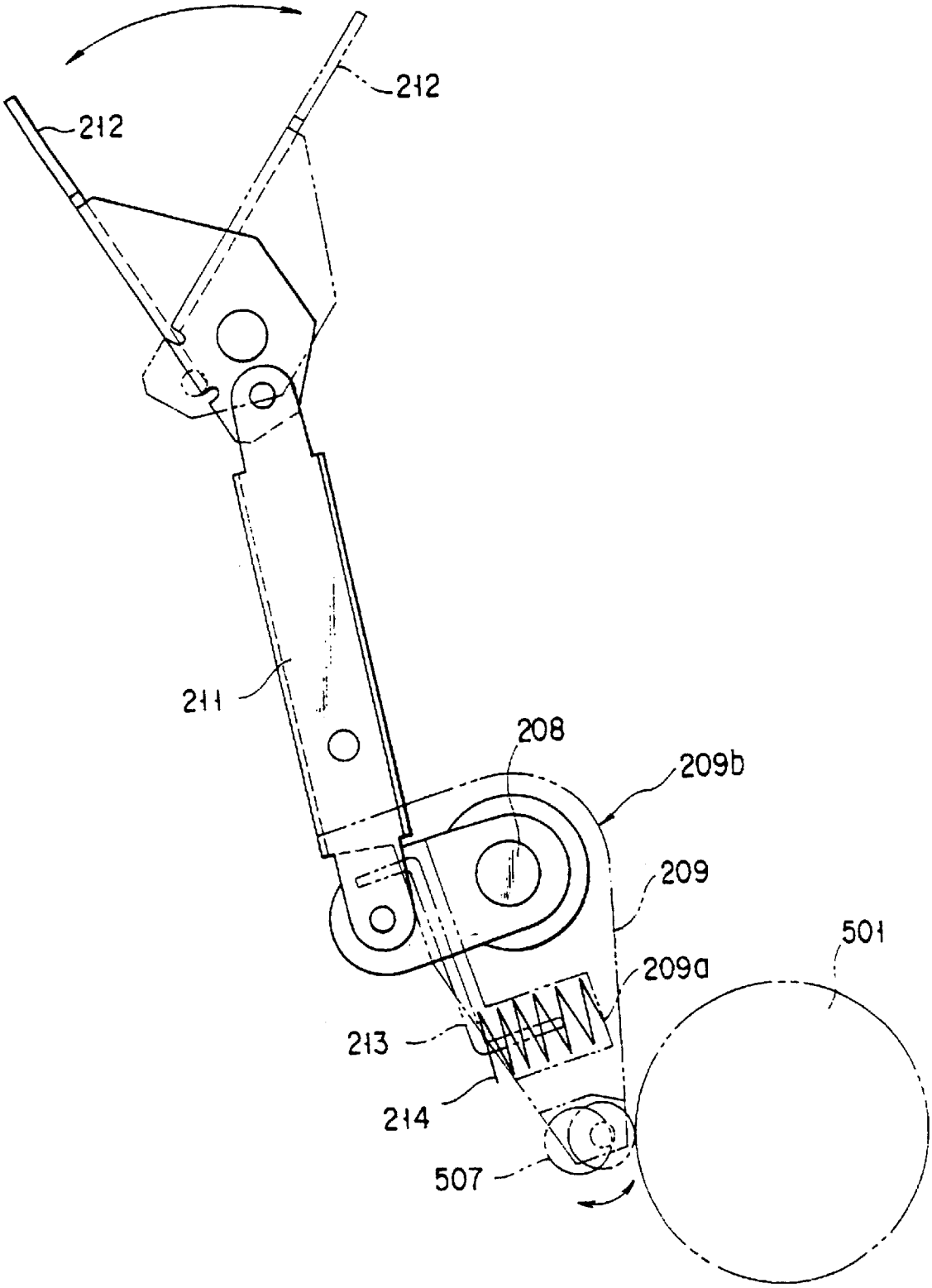
FIG. 17 is a side view of the construction shown in FIG. 1 in which a driving pinch roller is brought into contact with or separated from a platen roller by a lever operation.
Figure 18A:
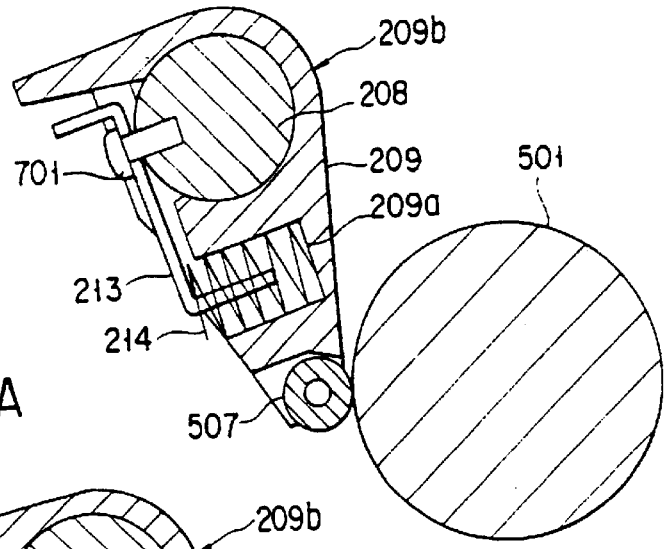
FIG. 18A is a sectional view showing a state in which the driving pinch roller is in contact with the platen roller.
Figure 18B:
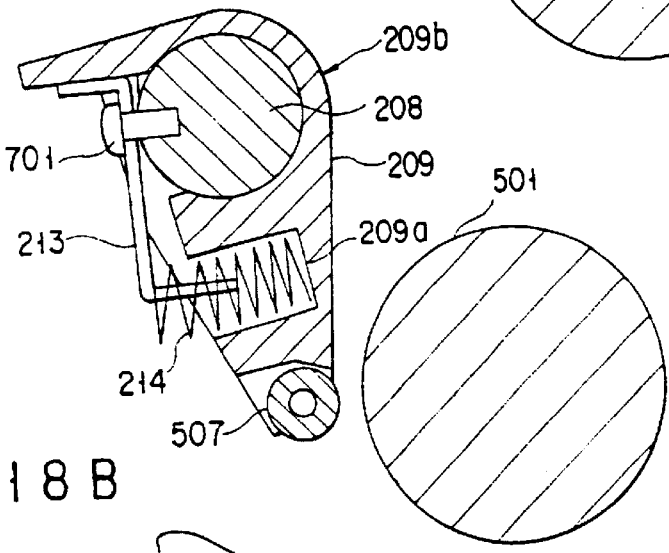
FIG. 18B is a sectional view showing a state in which the driving pinch roller is separated from the platen roller.

As illustrated in FIG. 17, therefore, when the lever 212 is pivoted in directions indicated by the arrows, the driving pinch roller 507 of each pinch holder 209 can be brought into contact with and separated from the platen roller 501.

More specifically, when the lever 212 is pivoted from a state indicated by the alternate long and two dashed lines to a state indicated by the solid lines in FIG. 17, the guide bar 208 is slightly rotated via the link mechanism 211. When the guide bar 208 thus rotates, each metal piece 213 also rotates and the biasing force of the spring 214 acts on the pinch holder 209. Since each pinch holder 209 is biased toward the platen roller 501 by the biasing force of the spring 214, the driving pinch roller 507 attached to the pinch older 209 is pressed against the platen roller 501 (FIG. 18A). When the lever 212 is pivoted in the reverse direction, the pinch holders 209 are moved apart from the platen roller 501. Consequently, each driving pinch roller 507 is separated from the platen roller 501 (FIG. 18B).

As shown in FIG. 16, sleeves 210 are rotatably fitted between the pinch holders 209 on the guide bar 208. The outer circumferential surface of each sleeve 210 is in almost the same position as a partial arcuated portion 209b (FIGS. 17, 18A, and 18B) of the outer circumferential surface, on the sheet conveyance path side, of each pinch holder 209. In the other portion, the outer circumferential surface of the sleeve 210 slightly projects from the outer circumferential surface of the pinch holder 209 in order than the sheets 101, 102, and 103 positively come in contact with each sleeve 210.

In this construction, each pinch holder 209 functions as a sheet guiding means which, by using the arcuated portion 209b, bends and guides the sheet 101, 102, or 103 conveyed through the first, second, or third conveyance path. The pinch holder 209 also functions as a means for bringing the driving pinch roller 507 into contact with the platen roller 501 or separating the driving pinch roller 507 from the platen roller 501. Consequently, it is possible to minimize the path lengths from the first, second, and third paper feed rollers 104, 106, and 106 to the platen roller 501.

In this embodiment, the first, second, and third paper feed rollers 104, 105, and 106 are arranged closer to the operation side Z than the conveyance path joint position (i.e., the platen board 502) near the arcuated portion 209b of each pinch holder 209. The first, second, and third roll sheets 101, 102, and 103 are entirely arranged on the operation side Z. In particular, the first roll sheet 101 is set above the moving space of the carriage unit 4. As a result, a large moving space can be ensured for the carriage unit 4 in the recording station 2 without changing the size of the entire apparatus, i.e., the area of the floor occupied by the apparatus. Additionally, since the first, second, and third roll sheets 101, 102, and 103 are entirely arranged on the operation side Z, the user can readily set the first, second, and third roll sheets 101, 102, and 103. This improves the operability of the apparatus.

As illustrated in FIG. 14, a thin plate member 207 is provided in the conveyance path joint position in order that the sheet 101, 102, or 103 conveyed through the first, second, or third conveyance path is bent and smoothly guided by the arcuated portions 209b.

This thin plate member 207 bends the leading edge of primarily the sheet 101, conveyed from the first conveyance path, in a direction opposite to the direction of curling. The thin plate member 207 is made of a stainless steel plate about 0.5 mm in thickness and has a fulcrum in a position closer to the operation side Z. The thin plate member 207 is so designed as to contact the pinch holders 209 and the sleeves 210 by its own weight. Note that the distal end portion of the thin plate member 207 on the side away from the fulcrum is partially bent toward the sleeves 210 and extends to the vicinity of the conveyance path joint position.

In the above construction for guiding and conveying the sheets 101, 102, and 103 from the first, second, and third roll sheets 101, 102, and 103 to the recording station 2, the first movable guide 118 is pushed down against the biasing force of the biasing spring 118b, and the leading edge of the first roll sheet 101 is inserted and nipped between the first paper feed roller 104 and the pinch roller 107. The rotational driving force of the platen roller 501 which is rotated by the motor 117 is transmitted to the first paper feed roller 104 via the driving belt 116 and the clutch 115, rotating the first paper feed roller 104 in the forward direction. Consequently, the sheet 101 is conveyed through the first conveyance path formed by the first movable guide 118 and the first fixed guide 122.

Thereafter, the leading edge of the sheet 101 conveyed to the conveyance path joint position near the pinch holders 209 is guided while being pressed down by the thin plate member 207 sitting on the sleeves 210 by its own weight. Since the thin plate member 207 has a proper weight, the sheet 101 moves forward along the thin plate member 207 without being buckled or pushing the thin plate member 207 upward. Additionally, the sheet 101 is smoothly conveyed on the sleeves 210 because the sleeves 210 are rotatably fitted on the guide bar 208.

The leading edge of the sheet 101 is then bent between the second fixed guide 121 and the sleeves 210 and guided to between the platen boards 502 and the pinch holders 209. The leading edge of the sheet 101 is nipped between the platen roller 501 and the driving pinch rollers 507 and conveyed to an image recording area to be described later.

Similarly, the leading edge of the second roll sheet 102 can be nipped between the second paper feed roller 105 and the pinch roller 108 by pushing down the second movable guide 119 against the biasing force of the biasing spring 119b. The sheet 102 is conveyed through the second conveyance path formed by the second movable guide 119 and the second fixed guide 121 by transmitting the rotational driving force of the platen roller 501 to the second paper feed roller 105 via the clutch 115. The leading edge of the sheet 102 is bent between the second fixed guide 121 and the sleeves 210 and guided to between the platen boards 502 and the pinch holders 209. The leading edge of the sheet 102 is nipped between the platen roller 501 and the driving pinch rollers 507 and conveyed to the image recording area to be described later.

As illustrated in FIG. 14, the leading edge of the third roll sheet 103 also can be nipped between the third paper feed roller 106 and the pinch roller 109 by pushing down the third movable guide 120 against the biasing force of the biasing spring 120b. The sheet 103 is conveyed through the third conveyance path formed by the third movable guide 120 and the second fixed guide 121 by transmitting the rotational driving force of the platen roller 501 to the third paper feed roller 106 via the clutch 115. The leading edge of the sheet 103 is bent between the second fixed guide 121 and the sleeves 210 and guided to between the platen boards 502 and the pinch holders 209. The leading edge of the sheet 103 is nipped between the platen roller 501 and the driving pinch rollers 507 and conveyed to the image recording area to be described later.

As shown in FIG. 13, in the image recording area provided in the recording station 2, the suction chamber of the platen unit 5 is evacuated to a negative pressure by the suction means 504 (FIG. 5). Accordingly, the air is drawn into the chamber by suction through the large number of holes 502b (FIG. 5) formed in the platen boards 502.

These holes 502b are formed downstream, in the sheet conveyance direction T (FIG. 5), of the windows 502a (FIG. 5) through which the platen roller 501 and the driving pinch roller 507 are nipped.

The sheet (101, 102, or 103) pushed out by the platen roller 501 and the driving pinch rollers 507 is kept flat while being drawn to the platen boards 502 by suction and slides on the platen boards 502 as it is pushed.

Note that the sheet sliding surface (on which the sheet slides) of each aluminum platen board 502 is treated with alumite in order to decrease the friction coefficient.

In accordance with the relationship between the direction of curling of the sheet 101, 102, or 103 and the positions of the platen boards 502, the leading edge of the sheet comes in contact with the platen boards 502, and the central swelled portion of the sheet formed by curling in the direction of the operation side Z separates from the platen boards 502.

Since the air in the central swelled portion of the sheet 101, 102, or 103 conveyed in this state is drawn by the suction means 504 by suction, the sheet 101, 102, or 103 is brought into tight contact with the platen boards 502.

The holes 502b in the platen boards 502 can be formed to have a diameter of approximately 1 to 4 mm. According to the experiments, diameters of about 2 mm were appropriate because the amount of deformation of a sheet was small. The holes 502b are densely formed near the side portions in the widthwise direction of a sheet and on the downstream side of each platen board 502 and sparsely formed in other portions.

The formation of these holes 502b enhances the effect of bringing the side portions of a sheet, which tend to float from the platen boards 502, into tight contact with the platen boards 502. This also enhances the effect of pressing down the sheet 101, 102, or 103 tightly on the upstream side of a cutter 205 to be described later when the sheet is cut by the cutter 205.

As illustrated in FIG. 13, the cutter 205 is attached to the downstream stay 506 (FIG. 5) constituting the suction chamber. The cutter 205 consists of a fixed blade 205a extending in the sheet widthwise direction (the direction perpendicular to the sheet conveyance direction) and a movable blade 205b which moves along the fixed blade 205a and cuts the sheet 101, 102, or 103.

A pair of paper delivery rollers 206 rotatably pressed against each other are arranged downstream of the cutter 205. The paper delivery rollers 206 are a driving roller 206a to be pressed against the non-recorded surface of a sheet and a driven roller 206b to be pressed against the recorded surface of a sheet. This driven roller 206b is so arranged as to be pressed against the recorded surface of a sheet before ink dries. To prevent ink from adhering to the outer circumferential surface of the driven roller 206b, therefore, needle-like projections (not shown) having acute points are formed on the outer circumferential surface of the driven roller 206b.

In this construction, when the sheet 101, 102, or 103 is cut by the cutter 205, a portion of the sheet upstream of the cut portion is drawn by suction and held to the platen boards 502 by the suction force of the suction chamber as described above, and a downstream portion of the sheet is pinched between the paper delivery rollers 206. This prevents any shift of the sheet when the sheet is cut. Furthermore, since the cutter 205 is directly attached to the suction chamber, the suction chamber can be positioned near the cut portion. Consequently, the cut portion of the sheet positioned and held on the suction chamber can be cut with a high accuracy.

Also, as illustrated in FIG. 5, the interior of the suction chamber is separated in at least one position in the sheet widthwise direction by a separator 508 having a notch for receiving the platen roller 501. Note that suction by the suction means 504 acts in each region separated by the separator 508. In this embodiment, the separator 508 is arranged in the boundary between the second roll sheet 102 and the third roll sheet 103. Two suction means 504 are provided in a region for the second roll sheet 102, and one suction means 504 is provided in a region for the third roll sheet 103.

In this construction, when the first roll sheet 101 having the largest width is conveyed a total of three suction means 504 are simultaneously operated. On the other hand, when the third roll sheet 103 having the smallest width is conveyed only one suction means 504 arranged in the region separated by the separator 508 is operated. When the second roll sheet 102 is conveyed the other two suction means 504 are operated.

The use of the separator 508 makes it possible to prevent the suction force of the suction chamber from becoming nonuniform depending on the width of a sheet being conveyed and to consume only necessary power. Additionally, since only necessary suction means 504 are thus selectively operated, generation of noise can be minimized.

The carriage unit 4 provided in the recording station 2 will be described below with reference to FIGS. 1 to 13.

The carriage unit 4 can move in opposition to and along the platen boards 502 of the platen unit 5 (FIG. 2). For this purpose, openings 201a and 202a which allow the passage of the carriage unit 4 are formed to oppose each other in the first and second frames 201 and 202, respectively (FIG. 5).

Two linear guides 203 and 204 are provided in positions adjacent to the openings 201a and 202a and in the vicinity of the platen unit 5 to extend in the direction perpendicular to the sheet conveyance direction T. These linear guides 203 and 204 are parallel to each other along the sheet conveyance direction T and extend parallel to the platen boards 502.

The linear guides 203 and 204 are fixed to the first and second frames 201 and 202 such that the two end portions of each linear guide project outward from the first and second frames 201 and 202.

The carriage unit 4 is slidably held by the two linear guides 203 and 204 via bearings. In a standby state before the apparatus is operated, the carriage unit 4 is placed in a home position (FIG. 7) outside the first frame 201.

An image recording unit 401 for ejecting ink components of four colors is provided in the carriage unit 4. In this image recording unit 401, four recording heads each having a plurality of nozzles (not shown) capable of ejecting ink are arranged along the sheet conveyance direction T. More specifically, the image recording unit 401 is constituted by arranging a recording head K for ejecting black ink, a recording head C for ejecting cyan ink, a recording head M for ejecting magenta ink, and a recording head Y for ejecting yellow ink, in this order from the upstream side in the sheet conveyance direction T.

These recording heads are so arranged that their respective ink components do not overlap each other in the slide direction of the carriage unit 4 (i.e., the direction perpendicular to the sheet conveyance direction T). Also, each recording head is so positioned as to maintain a fixed distance (about 1 mm) from the platen boards 502 while the carriage unit 4 is sliding. These recording heads used in this embodiment are inkjet heads, and the number of nozzles, i.e., channels, is 256 for each ink component.

The nozzles of these recording heads are so formed that the intervals between them are, e.g., 360 (DPI) along the sheet conveyance direction T. In this case the recording width of ink of one color is about 18 mm. The recording heads used in this embodiment are arranged at a pitch which is five-fourths of the width of each recording head. Accordingly, the width of the image recording unit 401 is about 90 mm. As a result, the platen boards 502 used in this embodiment are flatly positioned so that the distance to each recording head is kept constant throughout at least the width of the image recording region 402.

The carriage unit 4 includes ink cartridges 4a containing ink components of different colors and ink tanks 4b. The ink contained in each ink cartridge 4a is supplied to the corresponding recording head through the corresponding ink tank 4b.

In the carriage unit 4, a sensor S4 for detecting the sheet 101, 102, or 103 is arranged to oppose the platen boards 502.

Figure 7:
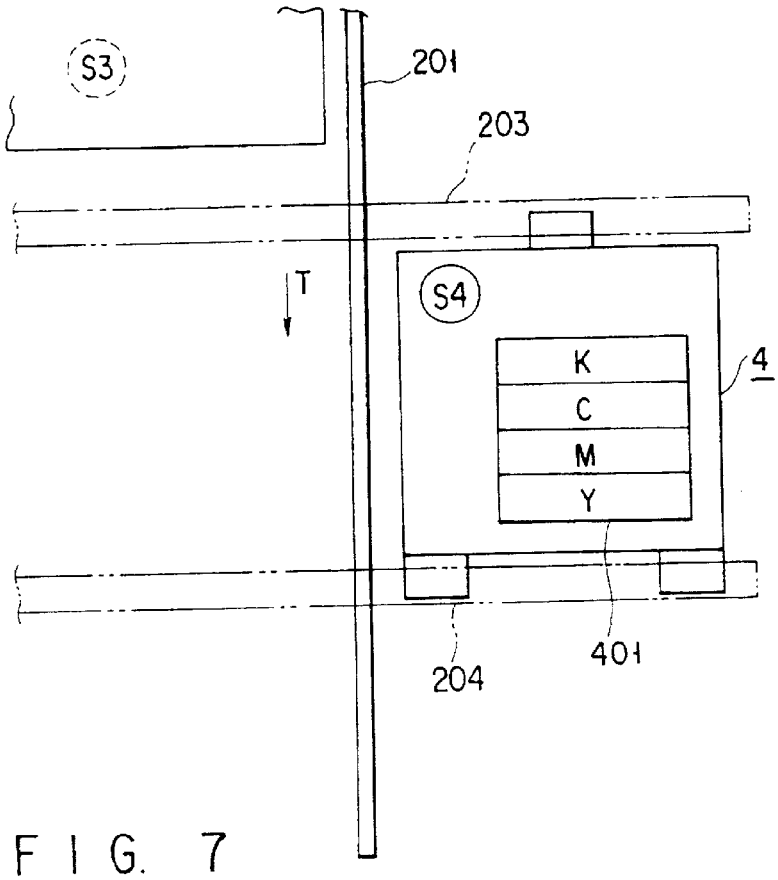
FIG. 7 is a view showing a state in which a carriage unit is placed in its home position.

As illustrated particularly in FIG. 7, the sensor S4 is arranged in a position upstream of the image recording unit 401 in the sheet conveyance direction T and closest to the sheet, when the carriage unit 4 is placed in the home position.

A position detection method of the carriage unit 4 will be described below.

Figure 8:
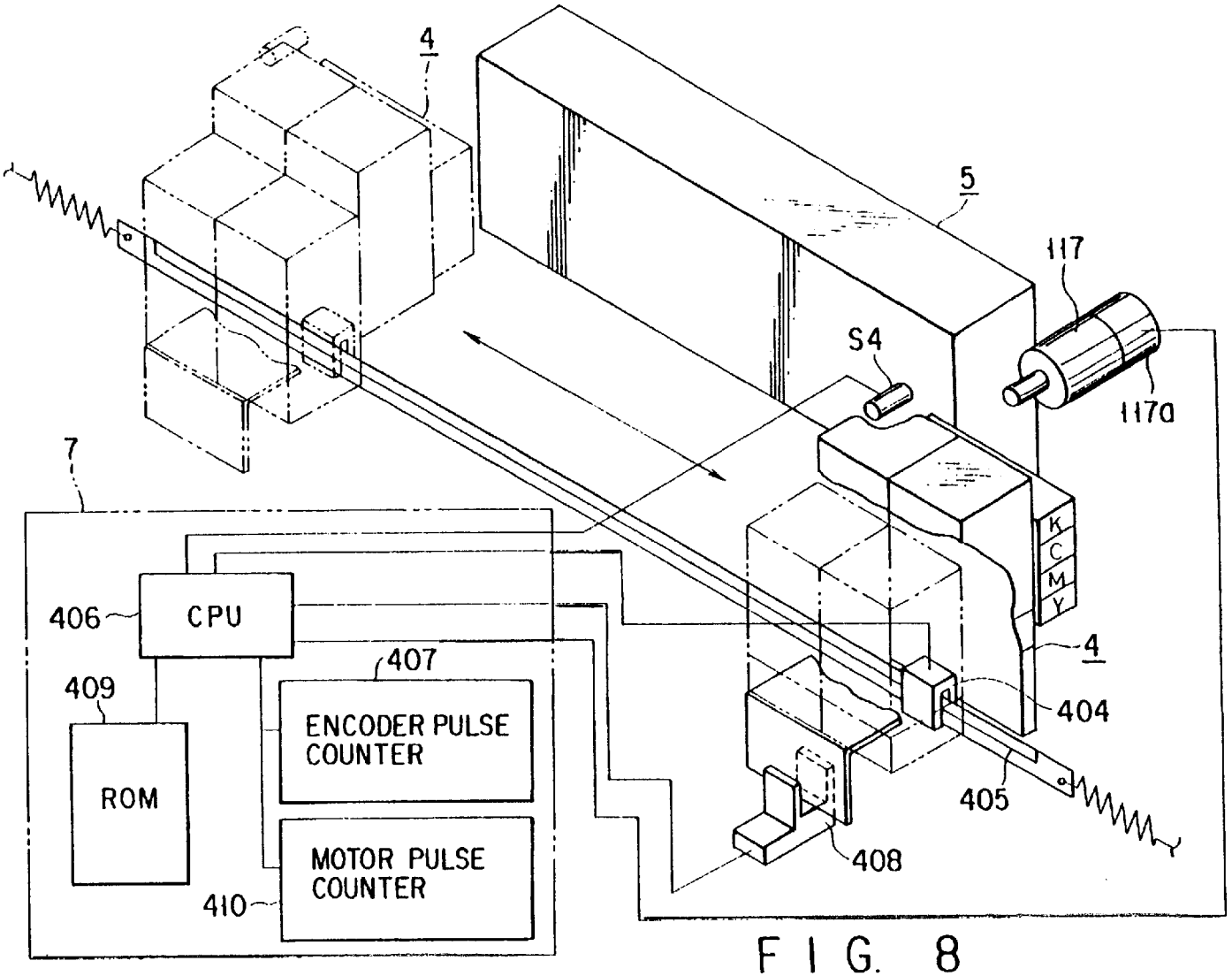
FIG. 8 is a perspective view schematically showing the construction of a position detection circuit of the carriage unit.

Assume that, as shown in FIG. 8, the carriage unit 4 is placed in the home position (FIG. 7) outside the first frame 201. When a driving mechanism (not shown) is operated in this state, the carriage unit 4 reciprocates along the platen boards 502 in directions indicated by the arrows in FIG. 8 while being guided by the linear guides 203 and 204.

The carriage unit 4 has a rear sensor 404 which can read the scale values (not shown) of a linear scale 405 extended over a width larger than the range of the reciprocating motion. Note that the scale values are recorded on the linear scale 405 at, e.g., intervals meeting the recording density of each recording head.

The pulse signal read by the linear sensor 404 is applied to an encoder pulse counter 407 via a control circuit (CPU) 406, and the pulse outputs are counted. In the home position (FIG. 7) described above, a home position sensor 408 connected to the control circuit 406 is provided and detects whether the carriage unit 4 is in the home position.

On the basis of the output from the home position sensor 408, the control circuit 406 counts the pulse outputs from the encoder pulse counter 407 and thereby detects the current position of the carriage unit 4.

In this embodiment, the first, second, and third roll sheets 101, 102, and 103 (FIG. 2) are positioned in the sheet widthwise direction by the respective corresponding sleeves 113 (FIG. 4). Therefore, the positions of the side portions and the width of each roll sheet correspond to the positions of the scale values of the linear scale 405. A memory (ROM) 409 connected to the control circuit 406 prestores the positions of the side portions and the width of each roll sheet on the basis of the counter value of the encoder pulse counter 407. Although the dimensions of the sheets 101, 102, and 103 change with changes in the environmental temperature and humidity, the data stored in this memory 409 are counter values based on the nominal dimensions.

Figure 9:
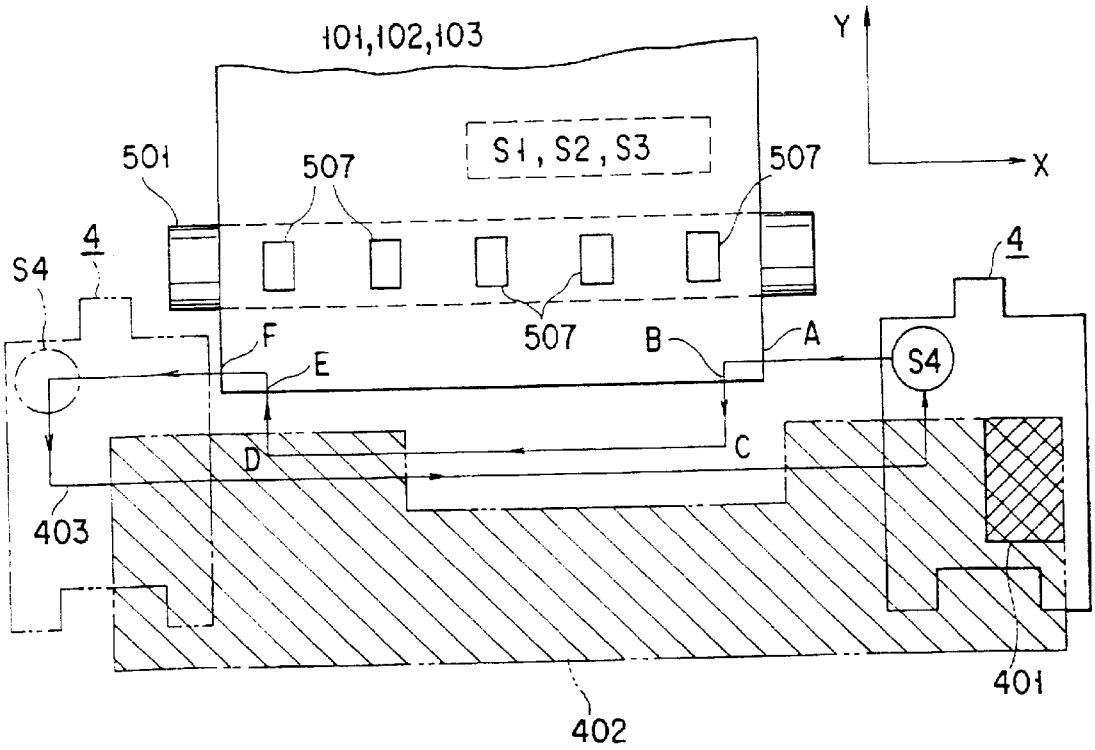
FIG. 9 is a view for explaining an operation when a sheet posture is measured by a sensor of the carriage unit.

A method of measuring the leading edge position of each sheet by using the sensor S4 of the carriage unit 4 will be described below with reference to FIGS. 8 and 9. In FIG. 9, the X axis indicates the moving direction of the carriage unit 4, and the Y axis indicates the moving direction of each sheet when the platen roller 501 rotates.

FIG. 9 shows a state in which the sensor S4 moves relative to the sheet 101, 102, or 103. In the following explanation, a method of measuring the leading edge position of the sheet 101 will be described as an example. Note that the same measurement method can be applied to the sheets 102 and 103 and so a detailed description thereof will be omitted.

When the platen roller 501 is rotated by the motor 117, an encoder 117a outputs pulses synchronized with the rotation of the motor 117. The pulse outputs from the encoder 117a are applied to a motor pulse counter 410 via the control circuit 406. The motor pulse counter 410 counts the pulse outputs and detects the leading edge of the sheet 101.

Note that FIG. 9 illustrates the method of detecting the leading edge of the sheet on the downstream side of the platen roller 501. However, the leading edge of the sheet can be roughly detected by sensors S1, S2, and S3 provided in a one-to-one correspondence with the sheets 101, 102, and 103 on the upstream side of the platen roller 501. Note also that the control circuit (CPU) 406, the encoder pulse counter 407, the memory (ROM) 409, and the motor pulse counter 410 are incorporated into a controller 7 arranged behind the platen unit 5 in the recording station 2 (FIG. 13). When in operation, this controller 7 is always cooled by the air drawn by suction by the suction chamber described previously.

A method of measuring the posture of any of the sheets 101, 102, and 103 by detecting the position of the side edges and the leading edge of the sheet by using the sensor S4 of the carriage unit 4 will be described below with reference to FIG. 9.

First, the leading edge of the sheet is detected by the corresponding one of the sensors S1, S2, and S3. On the basis of the detected data, the rotation of the platen rollers 501 is controlled and the leading edge of the sheet is positioned downstream of the sensor S4 and upstream of the image recording unit 401.

The carriage unit 4 is then moved in the X-axis direction from the home position. When the sensor S4 detects a position A of one side edge of the sheet, the scale value of the linear scale 405 (FIG. 8) is read by the linear sensor 404 (FIG. 8), thereby measuring the distance from the home position to the side-edge position A. The measured value from the linear sensor 404 is compared with the stored value in the memory 409 (FIG. 8). If the difference is within a previously stored allowable range, the measurement is continued. If the difference exceeds the allowable range, it is determined that the sheet is skewed, and sheet position error processing is executed.

To continue the measurement, while the sheet is conveyed backward, i.e., upstream, a leading-edge position B close to one side edge of the sheet is detected by the sensor S4. Thereafter, on the basis of the pulse count from the motor pulse counter 410 (FIG. 8), a distance BC from a position C at which the sheet is stopped to the leading-edge position B is measured.

The carriage unit 4 is then moved to a position D close to the other side edge of the sheet while the scale values of the linear scale 405 (FIG. 8) are read by the linear sensor 404. Subsequently, while the sheet is conveyed downstream a leading-edge position E close to the other side edge is detected by the sensor S4. Thereafter, on the basis of the pulse count from the motor pulse counter 410, a distance DE from the position D to the leading-edge position E is measured.

By calculating the difference between the measured distances DE and BC, the inclination or posture of the leading edge of the sheet is measured. If this inclination (the difference between the distances DE and BC) is larger than a previously stored allowable range, it is determined that the sheet is skewed, and the sheet position error processing is executed. If the inclination is within the allowable range, the measurement is continued.

To further continue the measurement, the carriage unit 4 is further moved to the other side edge of the sheet while the scale values of the linear scale 405 (FIG. 8) are read by the linear sensor 404. When the sensor S4 detects a position F of the other side edge of the sheet, the scale value of the linear scale 405 is read by the linear sensor 404, thereby measuring a distance AF from the side-edge position A to the side-edge position F of the sheet.

The pulse count of the movement of the carriage unit 4 over the distance AF is compared with the pulse count corresponding to the previously stored width of the sheet. If the difference falls inside an allowable range, the measurement is completed. If the difference falls outside the allowable range, sheet size failure processing is executed.

During the sheet posture measurement as described above, the moving range of the image recording unit 401 is restricted in the hatched area in FIG. 9, and so the sheet and the image recording unit 401 do not overlap each other. Therefore, even if the sheet is skewed to wrinkle, each recording head provided in the image recording unit 401 is not damaged. Also, even a skew of a wide sheet being conveyed can be accurately detected within short time periods by slightly moving the sheet. In addition, the sheet is slightly moved back and forth immediately downstream of the platen roller 501. Accordingly, even if the sheet is skewed because it does not smoothly enter the platen roller 501, no damage is given to the sheet.

Note that the above sheet posture measurement is performed at any of the points when automatic conveyance is performed immediately after each roll sheet is set in the apparatus, before an image recording operation, and after the image recording operation.

An operation of setting the first, second, and third roll sheets 101, 102, and 103 used in this embodiment in the image forming apparatus will be described below.

In the image forming apparatus of this embodiment, as illustrated in FIGS. 1 and 2, the first roll sheet 101 which is widest and heaviest can be set on the operation side Z (closest to an operator), and the second and third rolls sheets 102 and 103 which are comparatively light in weight can be set parallel to each other at the back of the first roll sheet 101. With this arrangement, the heaviest first roll sheet 101 can be set closest to the operation side Z, and this results in the advantage that the operator can easily set each roll sheet.

Figure 15:
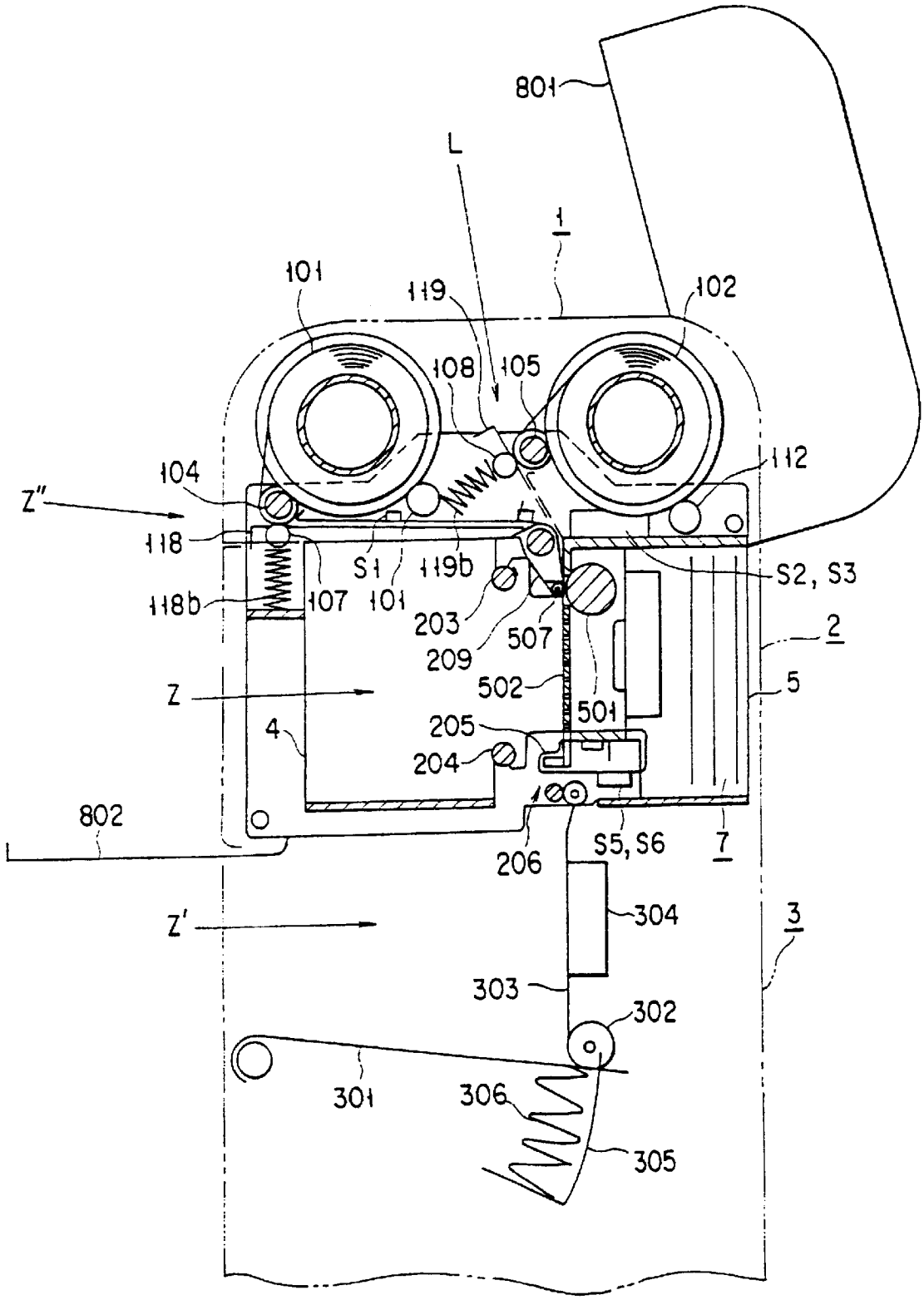
FIG. 15 is a partial sectional view showing a state in which a top cover and a front cover are opened to expose the interior.

As shown in FIG. 15, to set the first, second, and third roll sheets 101, 102, and 103, a top cover 801 which covers the paper feed station 1 is opened, and the flanges 101a and 101b attached to the two end portions of the first roll 101 are placed on the sleeves 113 and 114 of the paper feed roller 104 (FIG. 4). Analogously, the flanges of the second and third roll sheets 102 and 103 are placed on the sleeves of the second and third paper feed rollers 105 and 106, respectively (FIG. 2). Consequently, the first roll sheet 101 is rotatably supported on the first paper feed roller 104 and the first support roller 110, and the second and third roll sheets 102 and 103 are also rotatably supported on the second and third paper feed rollers 105 and 106 and the second and third support rollers 112 and 111, respectively (FIGS. 1 and 2).

After the leading edge of the first roll sheet 101 is pulled out, the first movable guide 118 is once pushed down against the biasing force of the biasing spring 118b, and the leading edge of the sheet 101 pulled out from the first roll sheet 101 is inserted and nipped between the first paper feed roller 104 and the pinch roller 107. Likewise, as illustrated in FIGS. 13 and 14, the leading edges of the second and third roll sheets 102 and 103 are pulled out, the second and third movable guides 119 and 120 are once pushed down against the biasing forces of the biasing springs 119b and 120b, and the leading edges of the sheets 102 and 103 pulled out from the second and third roll sheets 102 and 103 are inserted and nipped between the respective corresponding pairs of the second and third paper feed rollers 105 and 106 and the pinch rollers 108 and 109.

When the top cover 801 is closed after the first, second, and third roll sheets 101, 102, and 103 are thus set, a sensor (not shown) detects the motions of the first, second, and third movable guides 118, 119, and 120, and it is determined that the first, second, and third roll sheets 101, 102, and 103 are set.

The operations done by the operator are up to closing the top cover 801, and after that the closure of the top cover 801 is detected and the sensors S1, S2, and S3 check the sheets.

If the leading edge of any of the sheets 101, 102, and 103 is not detected by the corresponding one of the sensors S1, S2, and S3, the motor 117 and the clutch 115 (FIG. 4) are selectively driven to rotate the corresponding one of the first, second, and third paper feed rollers 104, 105, and 106 in the forward direction, thereby conveying the sheet until the leading edge of the sheet is detected by the corresponding one of the sensors S1, S2, and S3. If the leading edge of the sheet is not detected by the sensor S1, S2, or S3 after the sheet is conveyed a predetermined amount while the number of pulses is counted by the motor pulse counter 410 (FIG. 8), a sheet set error is determined. If the leading edge of any of these roll sheets is already detected by the corresponding one of the sensors S1, S2, and S3 when the roll sheet is set, the corresponding one of the first, second, and third paper feed rollers 104, 105, and 106 is rotated in the reverse direction and the leading edge of the sheet is again detected.

When the leading edge of each of the sheets 101, 102, and 103 is detected by the corresponding one of the sensors S1, S2, and S3, the conveyance of the sheet is stopped. As a consequence, the sheet is placed in a standby position.

Thereafter, these sheets are selectively fed and image formation processing is performed for a sheet of a desired size. In the following explanation, only the processing for the sheet 101 will be described as an example. Note that the same processing can be applied to the sheets 102 and 103 and so a detailed description thereof will be omitted.

When the sensor S1 detects the leading edge of the sheet 101, the first paper feed roller 104 is driven. The leading edge of the sheet 101 is guided from the sensor S1 to the guide bar 208, and the moving direction of the sheet is changed by the thin plate member 207 sitting by its own weight on the sleeves 210 rotatably fitted on the guide bar 208. Thereafter, the sheet 101 guided by the pinch holders 209 and the platen boards 502 is pinched between the platen roller 501 and the driving pinch rollers 507 and conveyed to the suction chamber. Since the suction chamber is evacuated by the suction means 504, the sheet 101 slides in the sheet conveyance direction T as it is kept in tight contact with the platen boards 502.

When the leading edge of the sheet 101 passes by the cutter 205, this leading edge is detected by the sensors S5 and S6 arranged at almost the same positions as the paper delivery rollers 206 downstream of the cutter 205.

Since the distances from the sensor S1 to the sensors S5 and S6 are previously set, a sheet conveyance error can be detected by counting the number of output pulses from the encoder 117a (FIG. 8) of the motor 117 by using the encoder pulse counter 407 (FIG. 8). More specifically, the number of output pulses from the encoder 117a is already stored in the memory (ROM) 409 of the controller 7 (FIG. 8). Therefore, the number of pulses output from the encoder 117a while the sheet 101 is actually conveyed is counted by the encoder pulse counter 407, and the count is compared with the prestored number of pulses. Consequently, whether the sheet 101 is conveyed a predetermined amount can be checked.

After the leading edge of the sheet 101 passes by the sensors S5 and S6 and is conveyed a predetermined amount, the conveyance of the sheet 101 is stopped. The cutter 205 is operated to cut the end portion of the sheet, and the cut sheet is delivered by the paper delivery rollers 206. As a consequence, the leading edge of the sheet can have a clear cut surface with no scratches. The sheet 101 from which the end portion is cut is returned to the standby position described above by reversely rotating the platen roller 501. Note that even during this return the leading edge of the sheet is drawn to the platen boards 502 by suction by the suction means 504.

In this construction, since the cutter 205 is arranged downstream of the platen boards 502, dust particles of a sheet produced when the sheet is cut freely fall and do not scatter onto the image recording unit 401 (FIG. 9). Also, dust particles attached to the leading edge of a sheet to be returned are drawn by suction by the suction means 504 (FIG. 5) when the sheet passes through the suction chamber. This prevents dust particles produced when the sheet 101 is cut from adhering to the sheet 101.

The peripheral velocity of each of the paper feed rollers 104, 105, and 106 is set to be higher by about 1% than that of the platen roller 501, and the peripheral velocity of the paper delivery rollers 206 is set to be higher by 5% than that of the platen roller 501. Accordingly, after the leading edge of a sheet is nipped between the platen roller 501 and the driving pinch roller 507 when the sheet is conveyed in the sheet conveyance direction T, the conveying operation by the corresponding paper feed roller is released by the clutch 115 (FIG. 4), and the sheet is conveyed only by the rotation of the platen roller 501. When the sheet is conveyed in the reverse direction, the corresponding paper feed roller is driven by the clutch and the sheet is conveyed by both the platen roller 501 and the paper feed roller.

An operation of forming an image on the widest first roll sheet 101 will be described below.

The sheet 101 in the standby position is fed a predetermined length by the set operation described above. The leading edge of the sheet 101 is positioned downstream of the sensor S4 in the carriage unit 4 and upstream of the image recording unit 401 by the platen roller 501 and the driving pinch rollers 507. As described earlier, the sensor S4 checks the width and position of the sheet 101 and the inclination of the leading edge. This check is done to previously detect an abnormal state such as a shrinkage of the sheet 101 occurring due to an environmental change while the sheet is standing by or a skew of the sheet 101 occurring while the sheet is conveyed from the standby position to the image recording unit 401. If such an abnormal state is detected by this check, a sheet set error is output and the sheet 101 is conveyed in the reverse direction until the leading edge comes out from the first paper feed roller 104. If there is no such problem, on the other hand, an image recording operation to be described below is started.

Image recording performed in the order of black (K), cyan (C), magenta (M), and yellow (Y) will be described below.

After the sensor S4 detects the leading edge of the sheet 101, the sheet 101 is conveyed to a position at which the leading edge of the sheet opposes the recording head K for ejecting black ink. Only black ink is then recorded on the sheet 101 by scanning the carriage unit 4 forward and backward.

In this reciprocating recording mode, when the forward motion of the carriage unit 4 is completed, the platen roller 501 is intermittently driven to convey the sheet 101 to a position at which the leading edge of the sheet 101 opposes the recording head C for ejecting cyan ink. When the backward motion is started, ink components of two colors, black and cyan, are recorded on the sheet 101.

Before the forward motion is again started, the sheet 101 is conveyed to a position where the leading edge of the sheet 101 opposes the recording head M for ejecting magenta ink. When the forward motion is started, ink components of three inks, black, cyan, and magenta, are recorded on the sheet 101.

Before the subsequent backward motion is started, the sheet 101 is conveyed to a position where the leading edge of the sheet 101 opposes the recording head Y for ejecting yellow ink. When the backward motion is started, ink components of all of the four colors are recorded on the sheet 101.

During this image recording operation, the sheet 101 is intermittently conveyed in synchronism with the motion of the carriage unit 4 while being in tight contact with the platen boards 502. The sheet 101 is then nipped between the paper delivery rollers 206.

As described above, the image recording can be started before the leading edge of the sheet 101 is nipped between the paper delivery rollers 206. Consequently, it is possible to minimize a non-recorded portion formed in the end portion of the sheet 101. Note that the image recording is completed in the reverse order by first completing printing of black and finally completing printing of yellow.

After the image recording is completed, the sheet 101 is conveyed until a cut boundary portion comes to the position of the cutter 205. The carriage unit 4 is moved to the home position, and the surface of each recording head is covered with a protection cap. Thereafter, the cut boundary portion is cut by the cutter 205.

As described above, the cut processing is performed after the surface of each recording head is covered with the protection cap. Consequently, it is possible to prevent paper dust produced by the cut from attaching to the surfaces of the recording heads.

An operation of continuously recording different images on the same sheet 101 will be described below.

Assume that when image recording is started immediately after the preceding image recording is completed, the sheet 101 is intermittently conveyed a feed length L.

If a cut boundary portion in an already recorded image region of the sheet 101 passes by the cut position of the cutter 205 while the sheet 101 is conveyed the feed length L, the sheet 101 is not conveyed the feed length L. That is, the sheet 101 is conveyed a length a (a<L) by which the cut boundary portion in the recorded image region is placed in the cut position of the cutter 205.

When the sheet 101 is conveyed the length a (a<L), the carriage unit 4 is retracted to the home position before the sheet is cut. After the recording heads are covered with the protection caps, the cut boundary portion of the sheet 101 is cut.

After the sheet is cut, the operation of the apparatus is paused until dust particles of paper freely fall and are removed by being drawn to the suction means 504 by suction. Thereafter, the sheet 101 is conveyed a length b (b=L−a). The result is that the sheet 101 is conveyed the feed length L.

The protection caps are then detached from the recording heads, and the subsequent image recording is started.

With this control different images can be continuously recorded on the same sheet 101, and consequently the image recording time can be shortened. Also, since each recording head is covered with the protection cap when the sheet is cut, paper dust adversely affecting the image recording does not adhere to the recording heads.

An image recording operation in a leading-and-trailing-edge no margin mode will be described below. To perform this operation, the no margin mode is chosen from the operation panel (not shown) of the image forming apparatus.

In the no margin mode, image recording is started after a margin with a predetermined length is assured in the leading edge of the sheet 101. The length of this margin is a minimum length with which the sheet 101 can be delivered by the paper delivery rollers 206.

In this no margin mode, the leading-edge margin is cut by the cutter 205 at the image recording start position. As in the case of the conventional sheet trailing edge cut sequence, the sheet is first conveyed only the length a (a<L) with respect to the feed length L, and the image leading edge position is cut. The sheet is then conveyed the remaining length b (b=L−a). While the sheet is cut, the carriage unit 4 is kept retracted to the home position, and the trailing-edge margin of the sheet 101 also is cut at the end position of the image recorded area. However, in some instances the preceding image somewhat extends to the leading edge of the following sheet 101 for the subsequent image recording due to an error during the sheet conveyance. If this occurs, a margin is formed in the leading edge of the sheet 101 for the subsequent image recording, and this margin is cut. As a result, the extended recorded image is removed together with the margin. In this case, however, the leading and trailing edges of the sheet 101 in the recorded image region are wasted in removing the extended recorded image.

An operation of simultaneously recording images on the second and third roll sheets 102 and 103 will be described below with reference to FIG. 6.

In plotters or the like apparatuses, a general approach is to rearrange input images in accordance with the sizes of the images by using a function called an auto-layout function, thereby printing the images with a high efficiency.

In this embodiment, A2- and A1-size images are recorded on the 594-mm wide second roll sheet 102 and at the same time A4- and A3-size images are recorded on the 297-mm wide third roll sheet 103.

Figure 6:
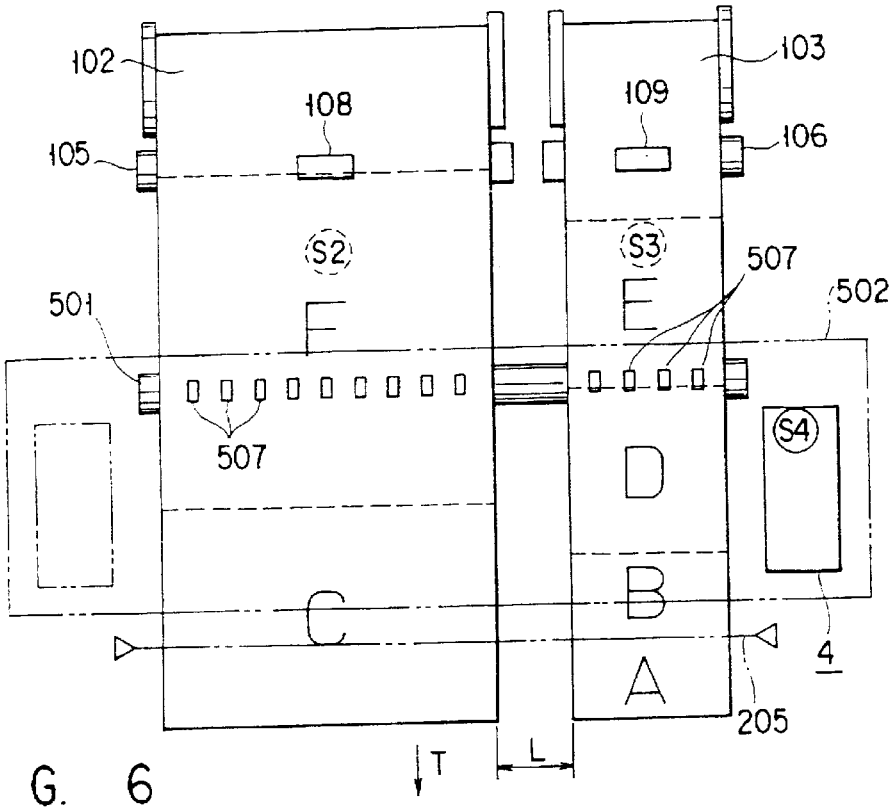
FIG. 6 is a view for explaining an operation of simultaneously recording images on a plurality of roll sheets.

As shown in FIG. 6, images of different sizes indicated by reference symbols A to F are recorded on the sheets 102 and 103 conveyed from the second and third roll sheets. Note that the broken lines in FIG. 6 represent the cut boundaries to be cut by the cutter 205.

Prior to performing image recording, the inclinations of the leading edges and the like conditions of the sheets 102 and 103 are independently checked (skew check) by the method described earlier. Image recording data is corrected so that the relationships between the leading edges of the sheets 102 and 103 and the image recording are held constant for the sheets 102 and 103.

When a plurality of images are simultaneously recorded on the sheets 102 and 103 in this way, the pause time of the carriage unit 4 in the end portion of the movement is relatively saved. This achieves a reduction of the recording time.

If the cut boundary of the image thus recorded passes by the cut position of the cutter 205, the sheet is not conveyed a predetermined feed amount at once. That is, as in the operation described previously, the sheet 102 or 103 is first conveyed until the cut boundary is placed in the cut position of the cutter 205.

When the cut boundary of the sheet 102 or 103 is placed in the cut position of the cutter 205, the movable blade 205b arranged in a gap L is moved to cut the cut boundary of the sheet to be cut. Thereafter, the sheet 102 or 103 is conveyed the remaining amount. As a consequence, the sheet 102 or 103 is conveyed a predetermined feed amount. The predetermined amount is a feed amount when the sheet is not to be cut.

Note that the movable blade 205b (FIG. 13) of the cutter 205 is arranged in the gap L between the two sheets 102 and 103 so that the cutter 205 acts only on one of the simultaneously conveyed sheets 102 and 103 to be cut. The movable blade 205b is moved in one direction from this gap L to cut the sheet 102 and moved in the other direction to cut the sheet 103.

If the cutter 205 is of a type which reciprocates in the sheet widthwise direction, the movable blade 205b of the cutter 205 is once stopped in the gap L by detecting the position of the blade 205b. To cut the widest sheet 101, it is only necessary to stop the blade outside the sheet width.

If the cutter 205 is mounted on the carriage unit 4 and its blade cuts the sheet by selectively entering and leaving the sheet conveyance path, it is only necessary to make the blade selectively act on the sheet 102 or 103 to be cut.

To simultaneously record images on the sheets 102 and 103 by using the auto-layout function as described above, a feed length to each subsequent cut boundary is calculated for each sheet before image recording is performed. If the difference between the calculated feed lengths is a predetermined value or smaller, simultaneous image formation is performed. If the difference exceeds the predetermined value, simultaneous recording is not performed. With this control it is possible to prevent the two sheets from being conveyed a long length while images are recorded only on one sheet.

The processing station 3 which processes the sheet on which an image of a predetermined size is recorded and which is cut by the cutter 205 as described above will be described below.

As shown in FIG. 1, the processing station 3 is arranged below the paper delivery rollers 206 and includes a table 301 on which the sheets 101, 102, and 103 can be placed. This table 301 is arranged with its one end portion on the operation side Z elevated so that an acute angle is formed with respect to the sheet conveyance direction T (a conveyance guide 303 to be described below).

The processing station 3 also includes the conveyance guide 303, a plurality of fans 304, and nip rollers 302. The conveyance guide 303 guides the sheets 101, 102, and 103, delivered from the paper delivery rollers 206, nearly directly below. The fans 304 are arranged throughout the width of the sheet on the side away from the sheet conveyance side of the conveyance guide 303. The nip rollers 302 are pivotally arranged on the lower end portion of the conveyance guide 303.

One end portion of the table 301 on the operation side Z is pivotally supported. The other end portion of the table 301 extending toward the nip rollers 302 is biased in the direction of the nip rollers 302 by a biasing spring 306 arranged below this end portion. Consequently, the upper surface of this end portion of the table 301 is always pressed against the nip rollers 302.

Figure 19:
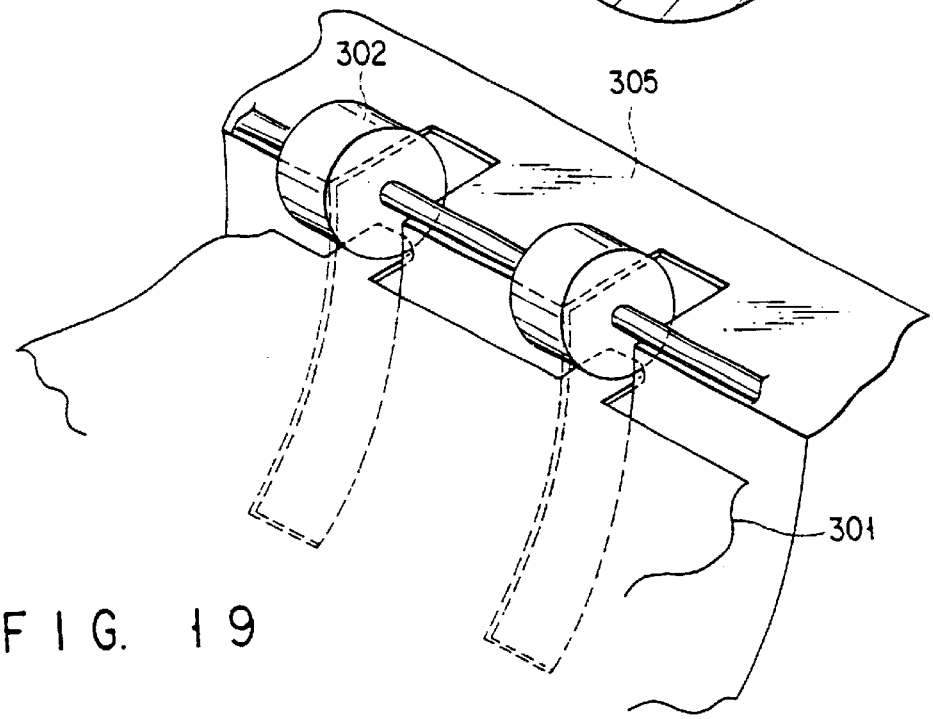
FIG. 19 is a partial perspective view showing the positional relationship between nip rollers, a table, and a stopper provided in the processing station.

As illustrated particularly in FIG. 19, an arcuated stopper 305 is arranged near this end portion of the table 301 in a direction perpendicular to the tangent passing the point of contact at which the table 301 is pressed against the nip rollers 302.

Figure 10A:
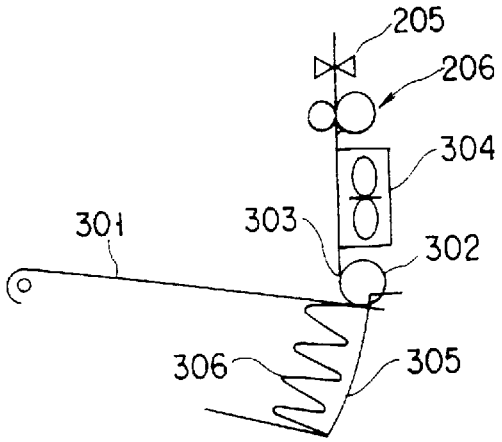
FIGS. 10A to 10E are views showing the steps of paper delivery processing in a processing station.

As shown in FIG. 10A, the sheet 101, 102, or 103 on which an image is recorded is delivered by the paper delivery rollers 206 and conveyed down as its non-recorded surface is guided by the conveyance guide 303. Note that since the sheet is a roll sheet, the leading edge of the sheet is slightly curled toward the conveyance guide 303.

Figure 10D:
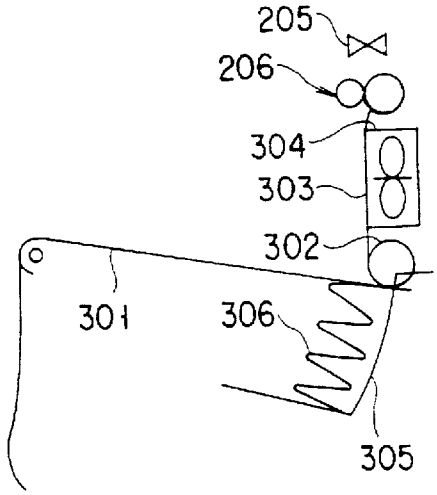
Figure 10B:
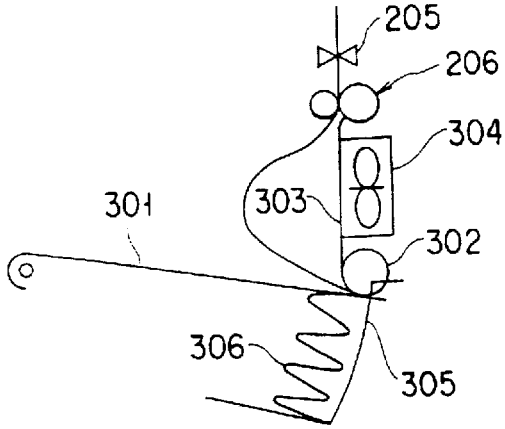

As illustrated in FIG. 10B, the leading edge of the sheet comes out from the conveyance guide 303 and, partly because of its curl, comes in contact with the contact portions between the table 301 and the nip rollers 302. When the leading edge of the sheet contacts well, the nip rollers 302 are slightly rotated by a driving motor (not shown). The amount of rotation need only be an amount with which the leading edge of the sheet is nipped between the nip rollers 302 and the table 301 and abuts against the stopper 305.

After the leading edge of the sheet abuts against the stopper 305 to stop, the sheet and the nip rollers 302 slip relative to each other. The friction coefficient of the nip rollers 302 is set to be slightly larger than the friction coefficient of the sheet. This prevents the sheet from being buckled.

Even after the leading edge of the sheet abuts against the stopper 305, the trailing edge of the sheet is kept recorded and conveyed. When a predetermined amount of recording is completed, therefore, the central portion of the sheet separates from the conveyance guide 303 and forms a loop.

Figure 10E:
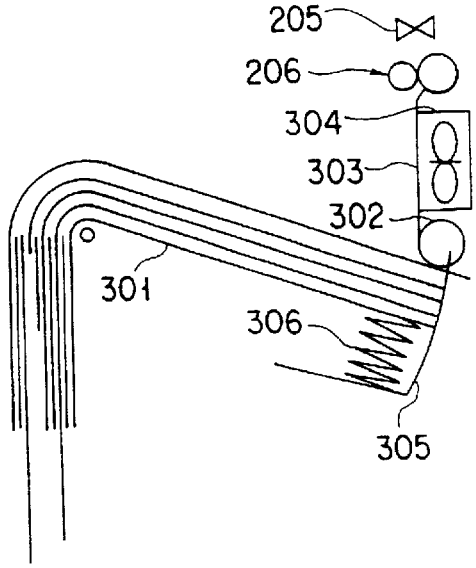
Figure 10C:
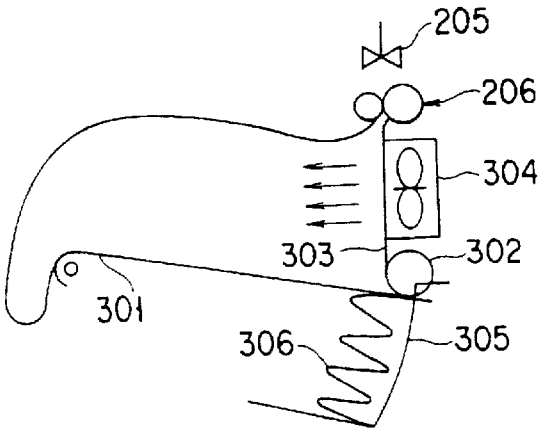

As shown in FIG. 10C, the fans 304 provided in the conveyance guide 303 are driven from the timing at which the leading edge of the sheet is nipped by the nip rollers 302 to the timing at which the trailing edge of the sheet is cut by the cutter 205, separated from the paper delivery rollers 206, and stacked. The trailing edge of the sheet is pushed toward one end of the table 301 by this wind pressure.

As shown in FIG. 10D, the trailing edge of particularly a long sheet hangs down from the table 301, and the leading edge of the sheet is nipped and held by the nip rollers 302.

As illustrated in FIG. 10E, by repeating the above operation sheets whose leading edges are nipped by the nip rollers 302 are sequentially stacked on the table 301.

The table 301 is pushed down in accordance with the thickness of the stacked sheets. The biasing spring 306 has a biasing force capable of resisting the weight corresponding to the thickness of the sheets stacked on the table 301 and holding the sheets so that the hanging trailing edges of the sheets do not fall.

The table 301 used in this embodiment is cut in at least the boundary between the sheets 102 and 103, and these cut tables 301 are independently biased. Accordingly, even when the roll sheet 103 is used often and only a small amount of the roll sheet 102 is used, the top surfaces of these sheets stacked on the tables 301 are nearly even with each other. Therefore, even if a wide sheet such as the roll sheet 101 is to be subsequently stacked on the stacked sheets 102 and 103, the sheet 101 is stably stacked with no trouble because the top surfaces of the sheets 102 and 103 are almost flush with each other. The table 301 also has the advantage that sheets having different lengths can be sequentially stacked. Furthermore, the trailing edge of each sheet is pushed away from the sheet stacking position by the wind pressure of the fans 304. Therefore, the trailing edge of each sheet does not block the leading edge of the next sheet to be stacked.

The processing station 3 according to a modification of this embodiment will be described below with reference to FIGS. 11 and 12.

Figure 11:
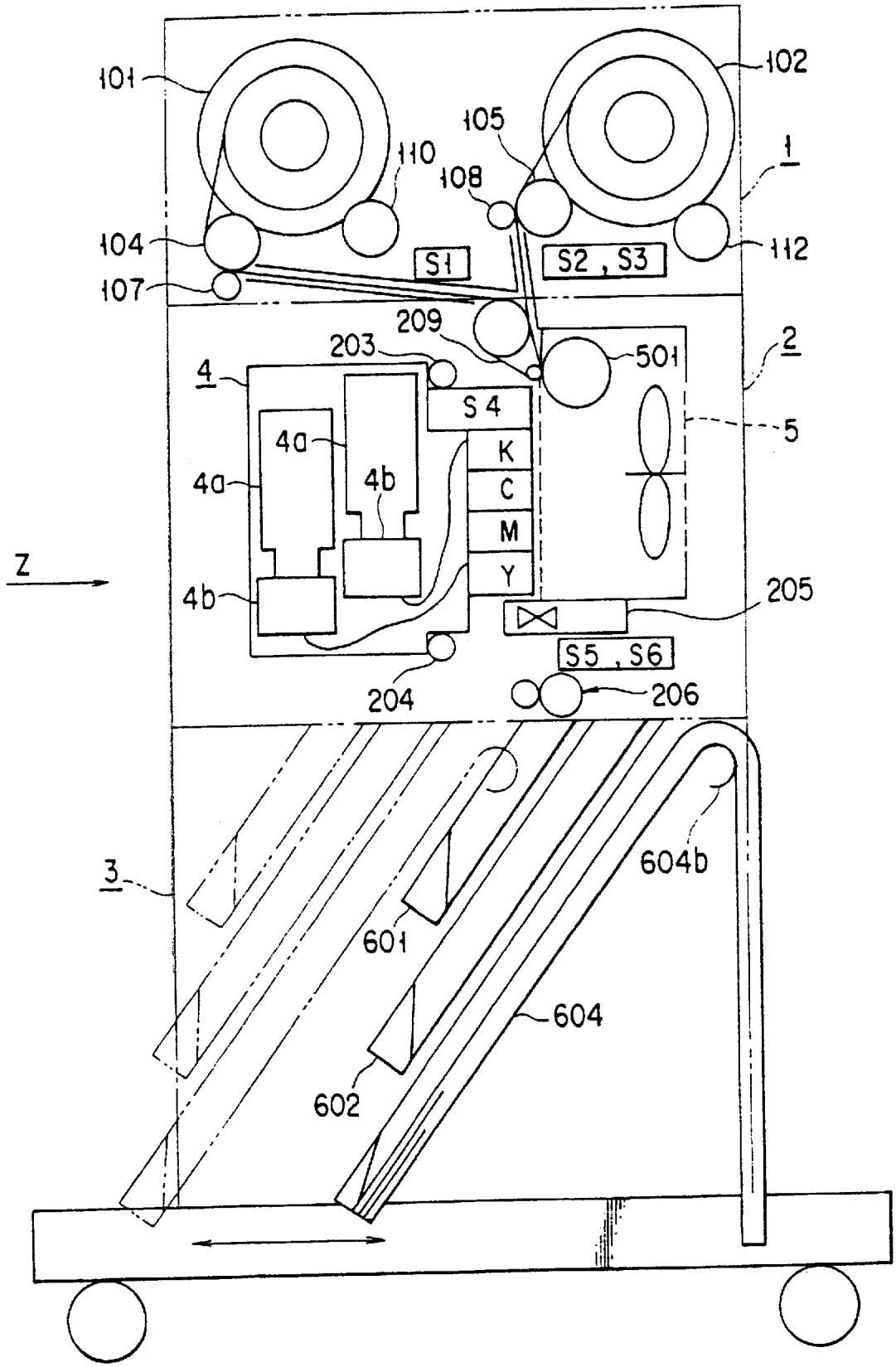
FIG. 11 is a side view showing the construction of the processing station according to a modification.

As shown in FIG. 11, the processing station 3 of this modification includes a plurality of paper delivery trays arranged below the paper delivery rollers 206 to receive recorded sheets in accordance with the sheet sizes. These paper delivery trays can be horizontally moved back and forth with respect to the operation side Z (in directions indicated by the arrows in FIG. 11).

Each paper delivery tray is inclined a predetermined angle and has a sheet inlet in one end portion opposing the paper delivery rollers 206 and a sheet outlet in the other end.

Figure 12:
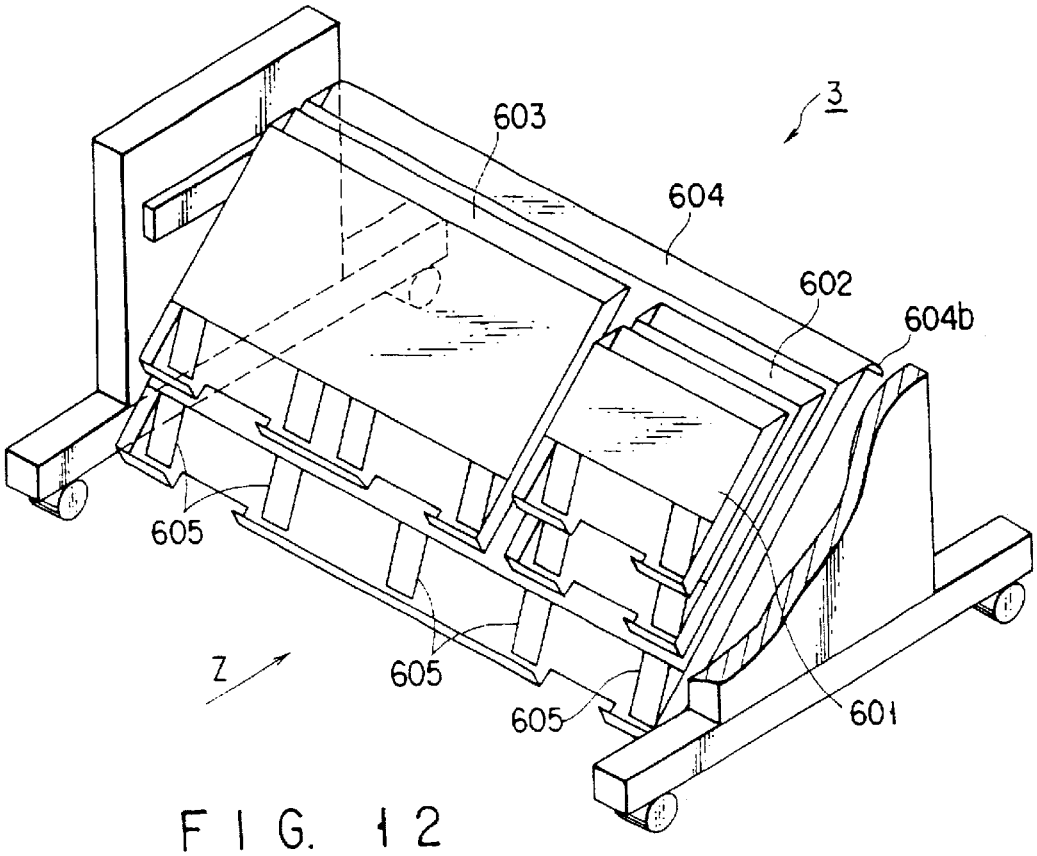
FIG. 12 is a perspective view of the processing station in FIG. 11.

As illustrated in FIG. 12, when A4- and A3-size recorded sheets are cut from the 297-mm wide roll sheet 103, a paper delivery tray 601 arranged on the operation side Z receives the A4-size sheets, and a paper delivery tray 602 arranged at the back of the paper delivery tray 601 when viewed from the operation side Z receives the A3-size sheets. A2-size sheets cut from the 594-mm wide roll sheet 102 are received by a paper delivery tray 603 juxtaposed to the paper delivery tray 602 in the sheet widthwise direction. When A1- and A0-size sheets are cut from the 841-mm wide sheet 101, these A1- and A0-size sheets are received by a paper delivery tray 604 arranged at the back of the juxtaposed paper delivery trays 602 and 603.

Accordingly, the processing station 3 is moved a predetermined amount in a predetermined direction in accordance with the size of a sheet to be delivered so that a paper delivery tray of a desired size is positioned below the paper delivery rollers 206.

The paper delivery tray 604 for receiving A1- and A0-size sheets has a depth designed to meet the A1 size. To receive an A0-size sheet, therefore, when the leading edge of the sheet reaches the bottom of the paper delivery tray 604 the processing station 3 is moved toward the operation side Z in synchronism with the paper delivery operation, so that the trailing edge of the sheet hangs down from the sheet inlet of the paper delivery tray 604. As a result, A0-size sheets are received as they are nearly folded in two. Accordingly, to protect sheets from damages, an arcuated portion 604b is formed at the sheet inlet of the paper delivery tray 604. Note that sheet push members 605 are arranged at the sheet outlet of each paper delivery tray.

The paper delivery trays are so arranged that the size of a sheet capable of being received increases from the front side to the rear side when viewed from the operation side Z. Therefore, all sheet outlets formed in the lower ends of these paper delivery trays are exposed to the operation side Z. This allows an operator to pick up sheets of a desired side without moving the processing station 3 even while sheets are being received. Also, since the paper delivery trays are arranged in the sheet widthwise direction in accordance with the arrangement of the first, second, and third roll sheets 101, 102, and 103 set in the apparatus, the depth of the processing station 3 can be decreased. Consequently, the processing station 3 need only be moved a little and hence does not move to protrude from the apparatus. Accordingly, the movement does not interfere with, e.g., walking in front of the apparatus.

An operation of releasing a paper jam will be described below.

As illustrated in FIG. 15, the first, second, and third roll sheets 101, 102, and 103 are arranged in the paper feed station 1 of the image forming apparatus of this embodiment and all these roll sheets are accommodated in the top cover 801.

One end portion of the top cover 801 at the back of the apparatus when viewed from the operation side Z is pivotally supported, and the other end portion of the top cover 801 at the front of the apparatus can be opened. In the recording station 2, a front cover 802 capable of being opened about its lower portion is arranged on the operation side Z opposing the platen boards 502.

Inside the top cover 801, as shown in FIG. 16, the lever 212 extends on the side of the roll sheets 101, 102, and 103 via the link mechanism 211 arranged outside the first frame 201. This lever 212 is connected to the guide bar 208 via the link mechanism 211. Therefore, by operating the lever 212 after the top cover 801 is opened, the driving pinch rollers 507 can be separated from the platen roller 501 (FIG. 17). As a result, the upstream ends of the sheets are nipped between the paper feed rollers 104, 105, and 106 and the pinch rollers 107, 108, and 109, respectively, and their downstream ends are nipped by the paper delivery rollers 206.

The nipping force of the paper delivery rollers 206 is extremely small compared to the conveying forces of other rollers (not shown). Accordingly, the leading edge of a jammed sheet can be easily returned to the sheet roll by manually rotating the corresponding paper feed roller in the reverse direction.

It is also possible to release the nipping forces acting on the sheets by the paper feed rollers and the pinch rollers by pushing down the first, second, and third movable guides 118, 119, and 120 against the biasing forces of the biasing springs 118b, 119b, and 120b, respectively (FIGS. 13 and 14). The result is that the leading edge of a jammed sheet can be easily returned to the sheet roll.

The first conveyance path (FIG. 13) formed by the first movable guide 118 and the first fixed guide 122 can be directly seen from an operation side Z" (FIG. 15) by opening the top cover 801. Also, the second conveyance path (FIG. 13) formed by the second movable guide 119 and the second fixed guide 121 and the third conveyance path (FIG. 14) formed by the third movable guide 120 and the second fixed guide 121 can be directly seen from the above, L (FIG. 15), of the apparatus by opening the top cover 801.

Accordingly, even if a paper jam as described above occurs, the operator can easily and reliably remove the jammed sheet by visually checking the jammed position.

When a paper jam occurs, the carriage unit 4 in the recording station 2 is so controlled as to retract to the home position arranged outside the first frame 201. Therefore, by opening the front cover 802 (FIG. 15) the operator can remove the jammed sheet while directly seeing the portion near the platen boards 502 from the operation side Z.

In the processing station 3 (FIG. 15) used in this embodiment, no apparatus constituent members are arranged on a lower operation side Z' downstream of the paper delivery rollers 206 and opposing the conveyance guide 303. This allows the operator to readily perform the paper jam processing from the lower operation side Z'.

On the other hand, the processing station 3 (FIGS. 11 and 12) according to the modification of this embodiment is so controlled that, when a paper jam takes place, the overall processing station 3 retracts to the back side of the apparatus beyond a normal moving distance. If this is the case, the paper delivery tray 601 arranged closest to the operation side is retracted to behind the paper delivery rollers 206. Consequently, the operator can readily perform the paper jam processing on the downstream side of the paper delivery rollers 206. Furthermore, even if a paper jam occurs in any of the paper delivery trays, the whole processing station 3 can be pulled out beyond a normal moving range toward the operation side by inputting a command from the operation panel (not shown). Accordingly, the operator can easily remove the jammed sheet from the paper delivery tray while directly seeing the inlet of the paper delivery tray.

An image forming apparatus according to the second embodiment of the present invention will be described below. The image forming apparatus of this embodiment is so designed as to be able to record a desired image on a sheet of a predetermined size. It is possible to use, e.g., recording paper, a sheet of paper, a plastic film, or cloth as the sheet.

In the following explanation, an image forming apparatus using a sheet of paper as an image recording sheet will be described as an example.

Figure 21:
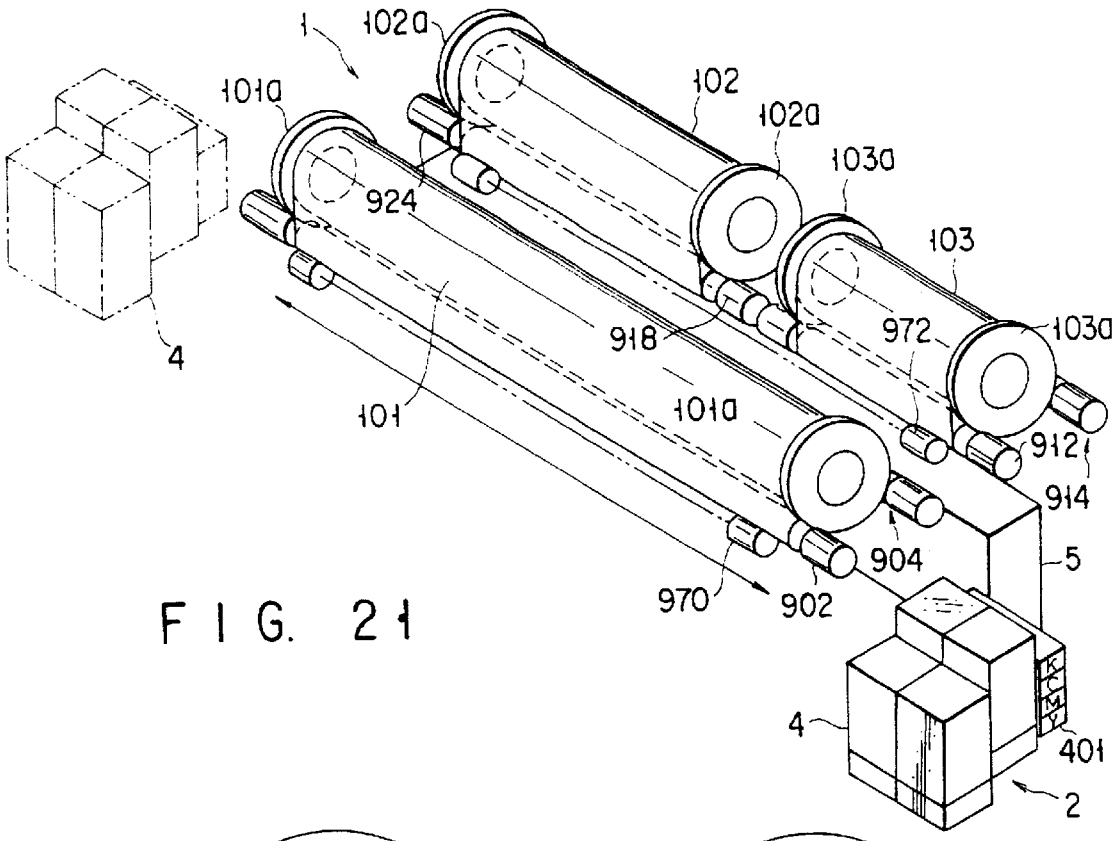
FIG. 21 is a persecutive view showing a state in which roll sheets of different sizes are set in the paper feed station in FIG. 20.
Figure 22:
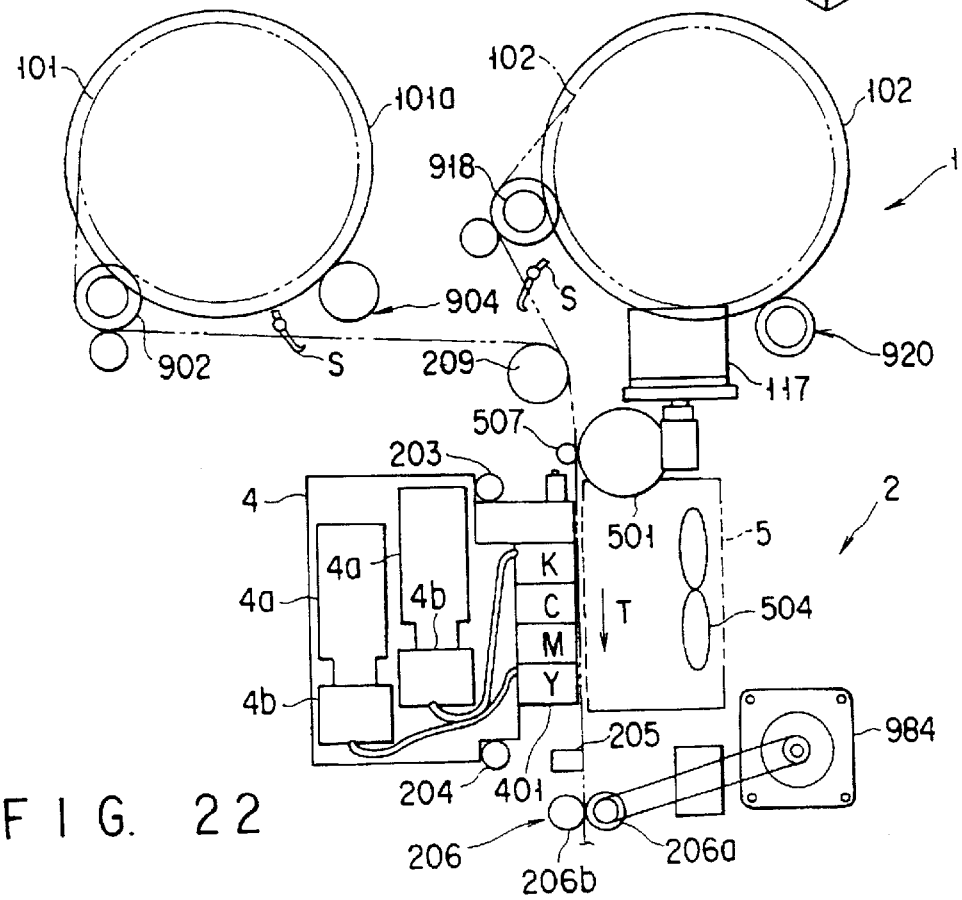
FIG. 22 is a view showing a state in which sheets of different sizes are fed from the paper feed station to a recording station.

As shown in FIGS. 21 and 22, the image forming apparatus of this embodiment includes a paper feed station 1, a recording station 2, and a processing station (not shown). The paper feed station 1 can accommodate a plurality of roll sheets each formed by winding a sheet of a predetermined size into a roll. The recording station 2 records a desired image on a sheet fed from the paper feed station 1. The processing station delivers the sheet on which the image is recorded by the recording station 2.

Figure 28A:
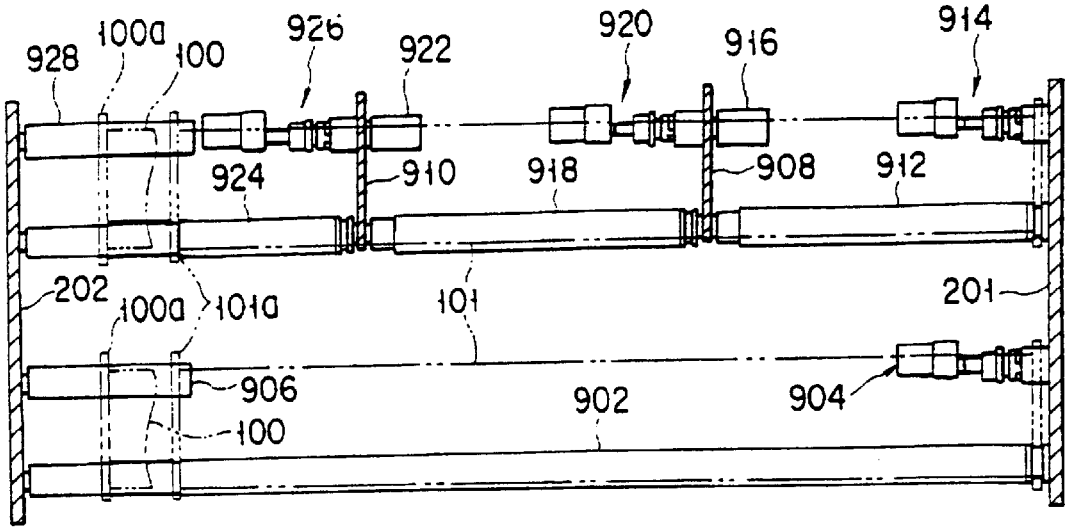
FIGS. 28A to 28C are plan views showing states in which roll sheets of different sizes are set in the paper feed station.
Figure 28B:
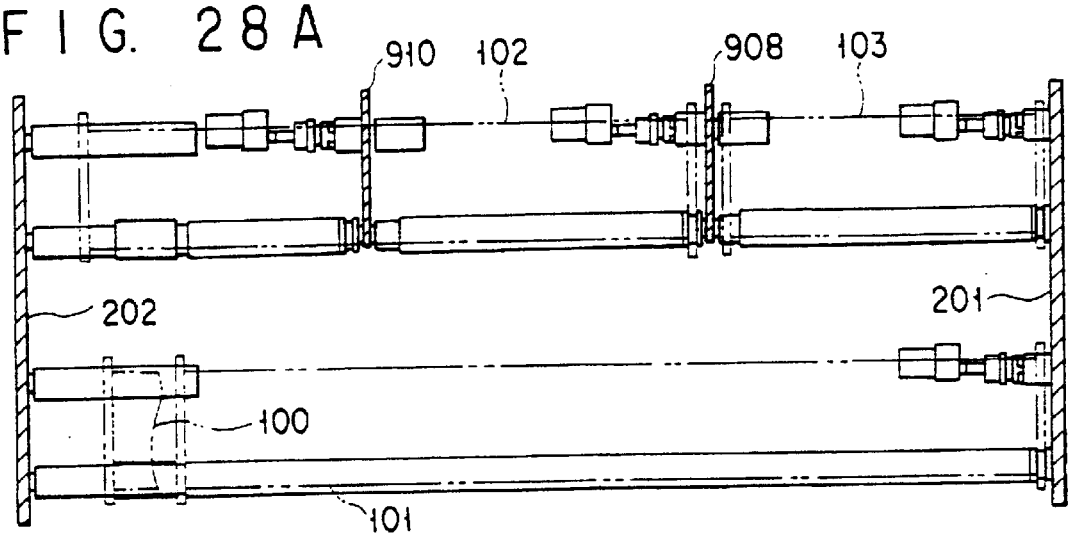
Figure 28C:
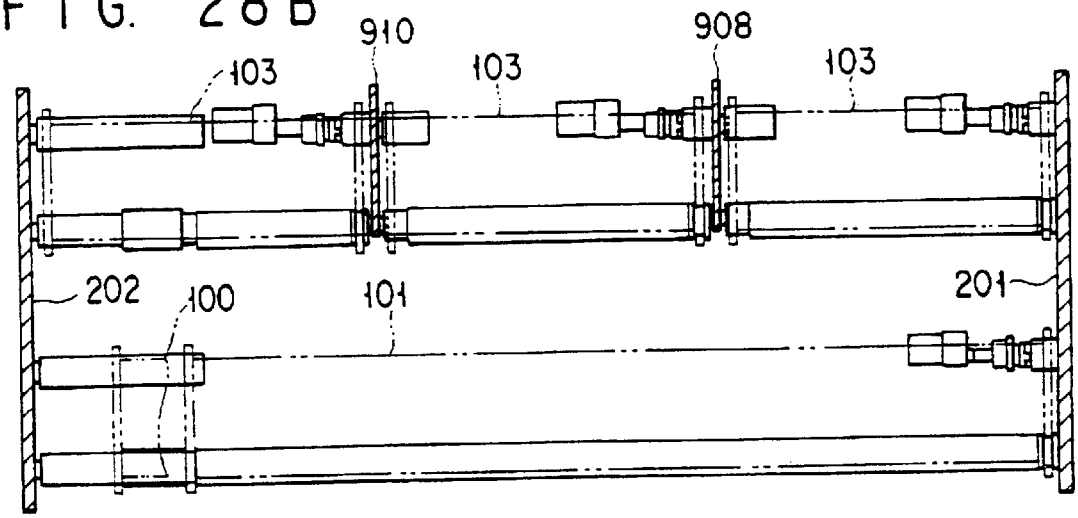

In this embodiment, it is assumed that a roll sheet formed by winding a 841-mm wide sheet 101 into a roll is an L-size roll sheet 101, a roll sheet formed by winding a 594-mm wide sheet 102 into a roll is an M-size roll sheet 102, a roll sheet formed by winding a 297-mm wide sheet 103 into a roll is an S-size roll sheet 103, and a roll sheet formed by winding a 914-mm wide sheet 100 into a roll is an LL-size roll sheet 100 (FIGS. 28A to 28C).

Figure 20:
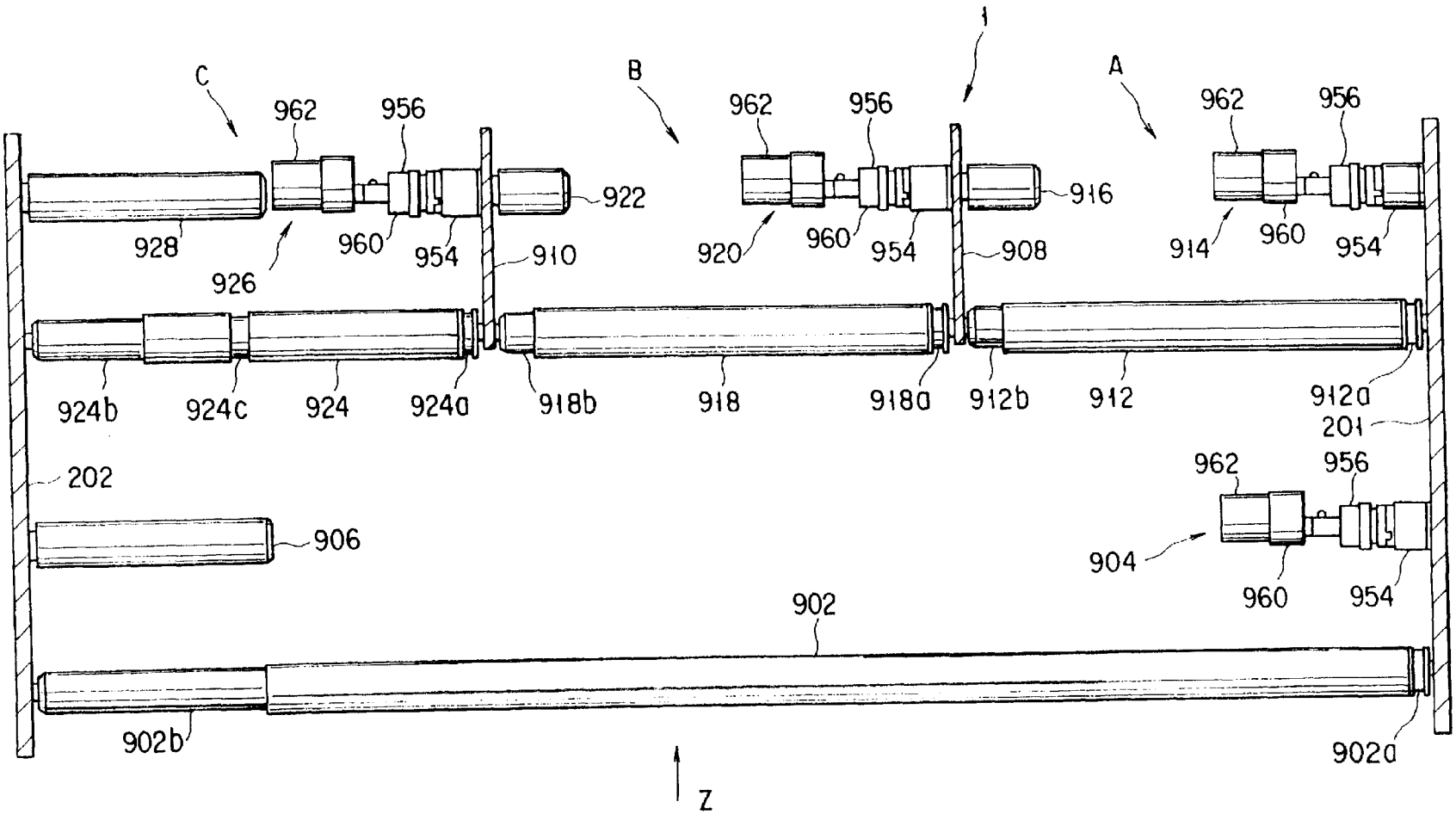
FIG. 20 is a plan view showing the construction of a paper feed station provided in an image recording apparatus according to the second embodiment of the present invention.

As shown in FIG. 20, a front paper feed roller 902, a front support roller mechanism 904, and a front support roller 906 are arranged in the paper feed station 1 so that the LL-size roll sheet 100 or the L-size roll sheet 101 can be set on the front side when viewed from an operation side Z.

The front paper feed roller 902 is rotatably supported by bearings (not shown) between first and second frames 201 and 202. A driving force transmitted from a motor 117 (FIGS. 4 and 22) to a driving belt 116 (FIG. 4) via a worm mechanism is transmitted to the paper feed roller 902 via a clutch 115 (FIG. 4). The paper feed roller 902 is so designed that the friction coefficient on the outer circumferential surface in a central portion is higher than that in the other portion.

The front support roller mechanism 904 is rotatably supported parallel to the front paper feed roller 902 by the first frame 201 via a bearing (not shown).

The front support roller 906 is rotatably supported coaxially with the support roller mechanism 904 and parallel to the paper feed roller 902 by the second frame 202 via a bearing (not shown).

Also, rear paper feed rollers, rear support roller mechanisms, and rear support rollers are arranged in the paper feed station 1 in order that the LL-size roll sheet 100, the L-size roll sheet 101, the M-size roll sheet 102, and the S-size roller sheet 103 can be selectively set on the rear side when viewed from the operation side Z. A driving force transmitted from a motor (not shown) to a driving belt (not shown) via a worm mechanism is transmitted to the rear paper feed rollers via a clutch (not shown). Each of these rear paper feed rollers is so designed that the friction coefficient on the outer circumferential surface in a central portion is higher than that in the other portion.

On the rear side of the paper feed station 1, first and second center frames 908 and 910 are arranged to be equally spaced between the first and second frames 201 and 202. These center frames 908 and 910 partition the rear side of the paper feed station 1 into three areas A, B, and C.

In the area A, a rear paper feed roller 912 is rotatably supported between the first frame 201 and the first center frame 908 by bearings (not shown). A rear support roller mechanism 914 is rotatably supported parallel to the rear paper feed roller 912 by the first frame 201 via a bearing (not shown). A rear support roller 916 is rotatably supported coaxially with the support roller mechanism 914 and parallel to the paper feed roller 912 by the first center frame 908 via a bearing (not shown).

In the area B, a rear paper feed roller 918 is rotatably supported between the first and second center frames 908 and 910 by bearings (not shown). A rear support roller mechanism 920 is rotatably supported parallel to the rear paper feed roller 918 by the first center frame 908 via a bearing (not shown). A rear support roller 922 is rotatably supported coaxially with the support roller mechanism 920 and parallel to the paper feed roller 918 by the second center frame 910 via a bearing (not shown).

In the area C, a rear paper feed roller 924 is rotatably supported between the second frame 202 and the second center frame 910 by bearings (not shown). A rear support roller mechanism 926 is rotatably supported parallel to the rear paper feed roller 924 by the second center frame 910 via a bearing (not shown). A rear support roller 928 is rotatably supported coaxially with the support roller mechanism 926 and parallel to the paper feed roller 924 by the second frame 202 via a bearing (not shown).

The three rear paper feed rollers 912, 918, and 924 arranged in the areas A, B, and C are positioned coaxially with each other and parallel to the front paper feed roller 902.

Sleeves 902a, 912a, 918a, and 924a are formed in end portions on one side of the front and rear paper feed rollers 902, 912, 918, and 924, and step portions 902b, 912b, 918b, and 924b are formed in end portions on the other side of these rollers 902, 912, 918, and 924. A step portion 924c on which a flange 101a (FIGS. 21 and 28A) of the L-size roll sheet 101 can fit is also formed in a position shifted from the center to the other end of the rear paper feed roller 924 arranged in the area C.

The first and second center frames 908 and 910 are provided with coupling mechanisms (FIGS. 23A and 23B) which can rotate the rear paper feed rollers 912, 918, and 924 independently of each other.

These coupling mechanisms will be described below with reference to FIGS. 23A and 23B. Note that since these coupling mechanisms have the same construction, only the coupling mechanism of the first center frame 908 will be described and a description of the coupling mechanism of the second center frame 910 will be omitted.

Figure 23A:
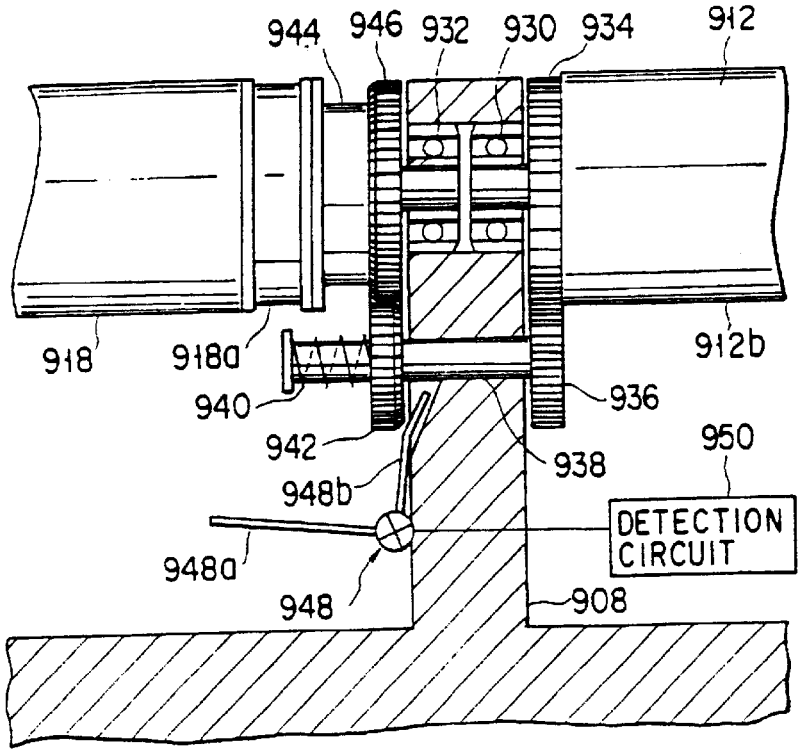
FIG. 23A is a view of the construction of a coupling mechanism applied to the image recording apparatus of the present invention, showing a state in which a plurality of paper feed rollers are simultaneously rotated.
Figure 23B:
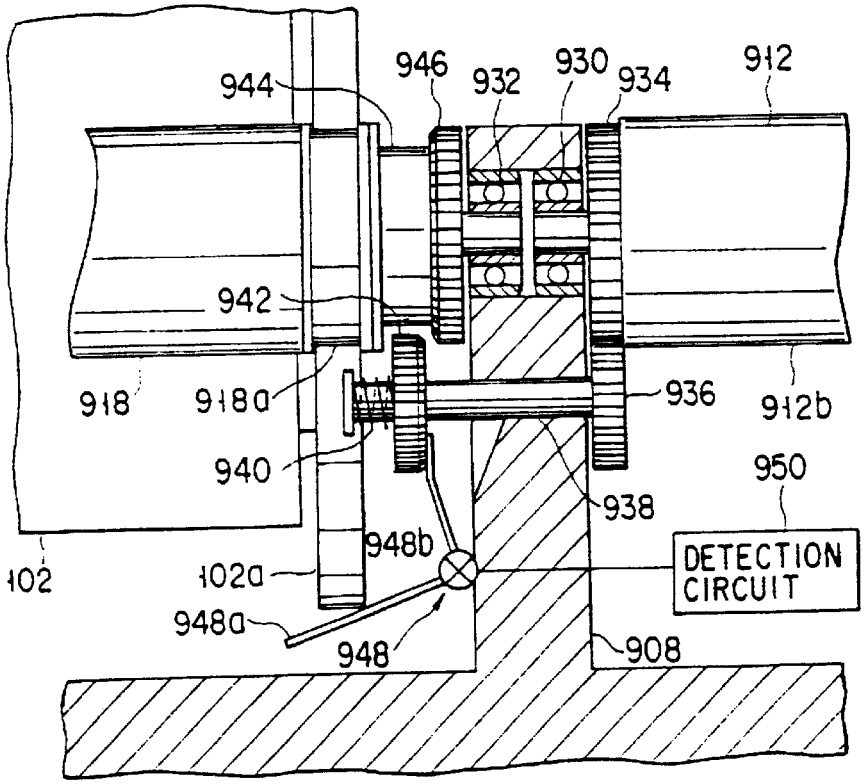
FIG. 23B is a view of the construction of the coupling mechanism applied to the image recording apparatus of the present invention, showing a state in which the paper feed rollers are independently rotated.

As shown in FIGS. 23A and 23B, the first center frame 908 rotatably supports one end of the rear paper feed roller 912 via a bearing 930 and also rotatably supports one end of the rear paper feed roller 918 via a bearing 932.

A gear 934 having a smaller diameter than the diameter of the paper feed roller 912 is arranged between the step portion 912b of the paper feed roller 912 and the bearing 930. A conduction gear 936 meshes with the gear 934.

The conduction gear 936 is fitted on one end of a gear shaft 938 which is rotatably supported by the first center frame 908. A slide gear 942 is fitted on the other end of the gear shaft 938 and is always biased toward the conduction gear 936 by a biasing spring 940. This slide gear 942 is slidable along the gear shaft 938 and unable to rotate.

A small-diameter shaft 944 is formed in one end portion of the paper feed roller 918 to extend from the sleeve 918a. A gear 946 capable of meshing with the slide gear 942 is formed in the extending end portion of the shaft 944. When a roll sheet of a given size is not set, the gear 946 and the slide gear 942 are kept meshed by the biasing spring 940.

Assume, for example, that the M-size roll sheet 102 is set across the areas B and C (FIG. 20) as illustrated in FIGS. 21 and 23B. The M-size roll sheet 102 is set in the areas B and C as it is positioned in the axial direction by placing a flange 102a on the rear support roller mechanism 920, the sleeve 918a of the rear paper feed roller 918, the step portion 924b of the rear paper feed roller 924, and the rear support roller 928.

When the M-size roll sheet 102 is set as above, an operation arm 948a of an actuator 948 which is pivotally supported by the first center frame 908 is urged by the flange 102a. A pressure arm 948b of the actuator 948 urges the slide gear 942 against the biasing force of the biasing spring 940. As a result, the slide gear 942 and the gear 946 are released from the meshed state. This allows the paper feed roller 912 in the area A and the paper feed roller 918 in the area B to rotate independently of each other. Therefore, when, for example, the S-size roll sheet 103 is set in the area A (FIG. 20) and the M-size roll sheet 102 is set across the areas B and C (FIG. 20), as illustrated in FIG. 21, and the image forming apparatus is driven by an operation panel 952 (FIG. 29) provided on a top cover 801, it is possible to feed a desired sheet from at least one of the M-size roll sheet 102 and the S-size roll sheet 103.

When the M-size roll sheet 102 is removed as shown in FIG. 23A, the urging force of the operation arm 948a of the actuator 948 is released. Consequently, the slide gear 942 is biased by the biasing spring 940 and meshed with the gear 946. This allows the paper feed roller 912 in the area A and the paper feed roller 918 in the area B to rotate together.

Figure 29:
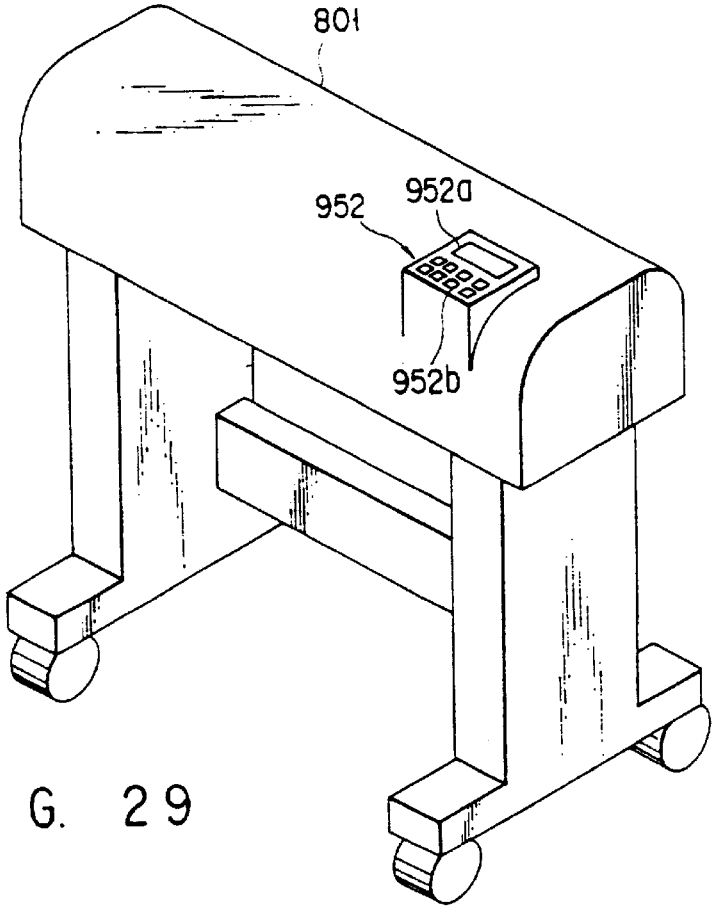
FIG. 29 is a perspective view showing the outer appearance of an overall image forming apparatus according to one embodiment of the present invention.

The operation state (FIGS. 23A and 23B) of the actuator 948 is constantly monitored by a detection circuit 950. On the basis of an output detection signal from the detection circuit 950 to the operation panel 952 (FIG. 29), a display unit 952a of the operation panel 952 displays the set positions and set conditions of the roll sheets 100, 101, 102, and 103. Consequently, the operator can recognize the set positions and set conditions of the roll sheets 100, 101, 102, and 103 set in the image forming apparatus without opening the top cover 801 (FIG. 29).

Assume that as shown in FIG. 21, the S-size roll sheet 103 is set in the area A (FIG. 20), the M-size roll sheet 102 is set across the areas B and C (FIG. 20), and the L-size roll sheet 101 is set in the front.

To rewind the sheets 101, 102, and 103 while image recording is performed for a given one of the sheets 101, 102, and 103 or after predetermined image recording is completed, the sheets 101, 102, and 103 are rewound by driving the support roller mechanisms 904, 914, 920, and 926.

The support roller mechanisms 904, 914, 920, and 926 will be described below with reference to FIG. 24. Note that since these support roller mechanisms have the same construction, only the front support roller mechanism 904 will be described below and descriptions of the other support roller mechanisms 914, 920, and 926 will be omitted.

Figure 24:
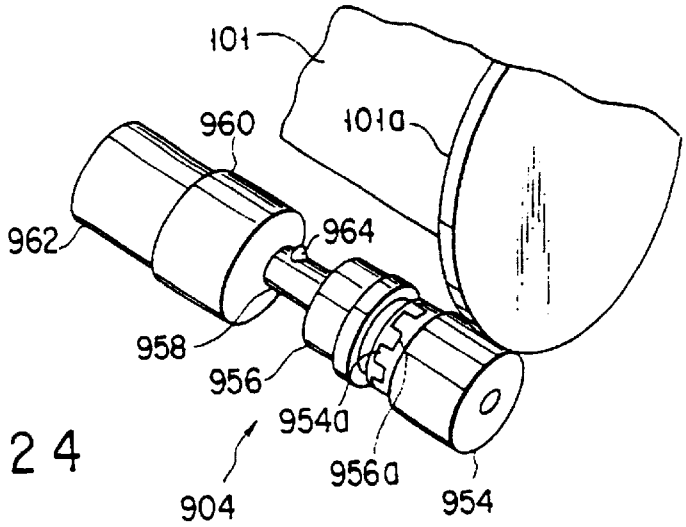
FIG. 24 is a perspective view showing the construction of a support roller mechanism arranged on the front and rear sides of the image recording apparatus of the present invention.

As shown in FIG. 24, the support roller mechanism 904 consists of a support roller 954 and an electromagnetic clutch 956. The support roller 954 is made from a material (e.g., rubber) having a certain high friction coefficient and is freely rotatable. The electromagnetic clutch 956 has a second meshing portion 956a which can mesh with a first meshing portion 954a of the support roller 954. The electromagnetic clutch 956 is connected to a reduction gear 960 via a shaft 958, and this reduction gear 960 is connected to a reverse motor 962. The shaft 958 is fixed to a rotating shaft (not shown) of the reduction gear 960 by a machine screw 964.

When the L-size roll sheet 101 is set in the front of this construction, the flange 101a of the L-size roll sheet 101 is placed on the support roller 954 of the support roller mechanism 904.

To feed the sheet 101 in this state, the support roller 954 is freely rotated as the flange 101a rotates because the first and second meshing portions 954a and 956a are released from the meshed state.

To rewind the sheet 101, the reverse motor 962 and the electromagnetic clutch 956 are operated by operating an operation key 952b (FIG. 29) on the operation panel 952. Consequently, the second meshing portion 956a meshes with the first meshing portion 954a of the support roller 954. At the same time, the rotational force of the reverse motor 962 is reduced by the reduction gear 960 and transmitted to the electromagnetic clutch 956. As a result, the support roller 954 is reversely rotated to rewind the sheet 101 to the L-size roll sheet 101.

During the paper feed operation or the rewind operation as described above, a given one of the roll sheets 101, 102, and 103 is conveyed along one of conveyance paths (FIG. 26) formed between movable guides 966 and 968 and fixed guides 122 and 121 having a desired rigidity.

Figure 26:
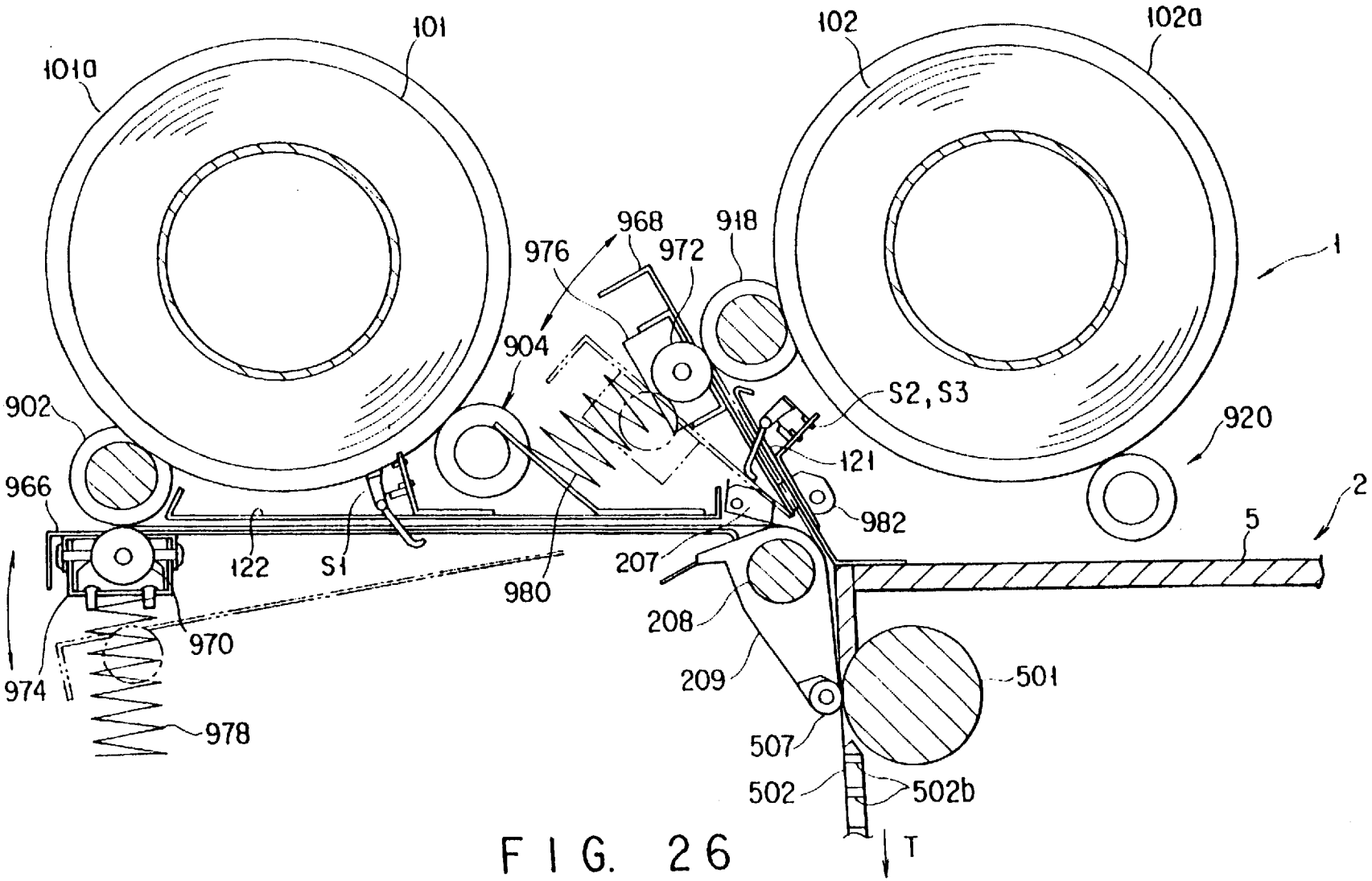
FIG. 26 is a view showing the construction of a conveyance path and its peripheral portion between the paper feed station and the recording station.

As shown in FIGS. 21 and 26, the sheets 101, 102, and 103 are selectively fed from the L-, M-, and S-size roll sheets 101, 102, and 103 such that the sheet 101 is conveyed along the conveyance path (FIG. 26) formed between the fixed guide 122 and the movable guide 966 and the sheets 102 and 103 are conveyed along the conveyance path (FIG. 26) formed between the fixed guide 121 and the movable guide 968.

Figure 25A:
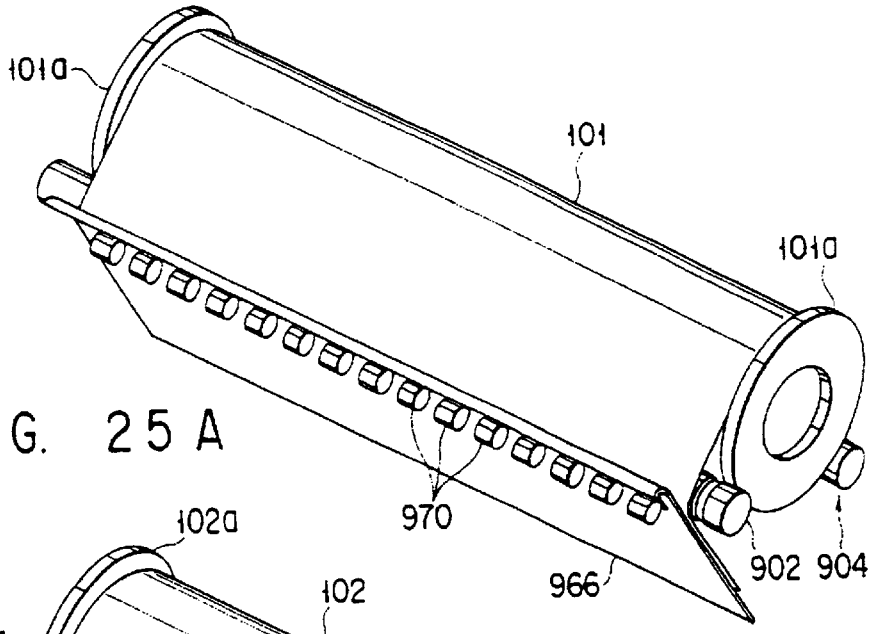
FIG. 25A is a perspective view showing the arrangement of a plurality of pinch rollers applied to the image recording apparatus of the present invention, in which a plurality of pinch rollers arranged on the front side are illustrated.
Figure 25B:
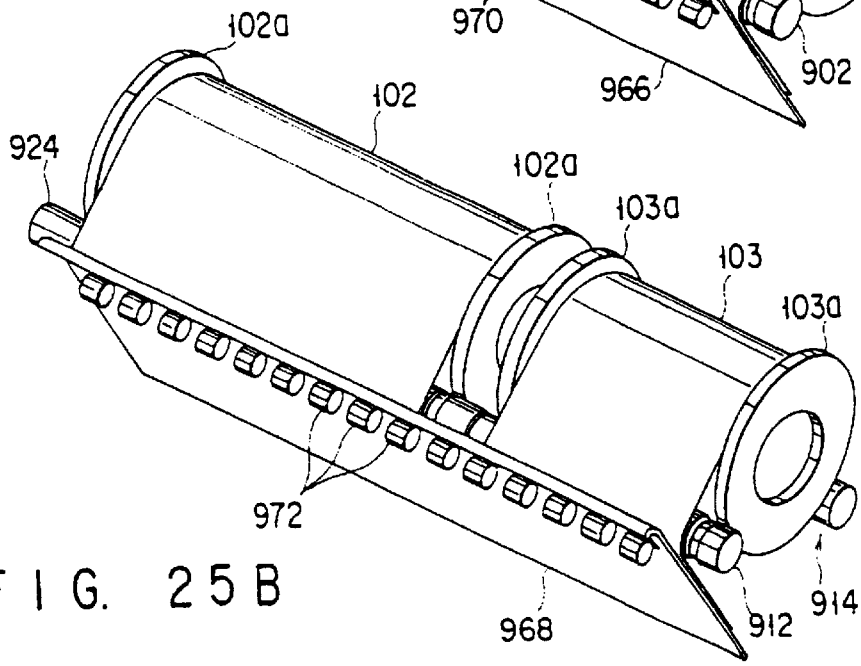
FIG. 25B is a perspective view showing the arrangement of a plurality of pinch rollers applied to the image recording apparatus of the present invention, in which a plurality of pinch rollers arranged on the rear side are illustrated.

In order to smoothly and stably feed the sheets 101, 102, and 103, a plurality of rotatable pinch rollers 970 and 972 are arranged on the movable guides 966 and 968 along a direction perpendicular to a sheet conveyance direction T (FIGS. 25A and 25B).

As shown in FIGS. 25A, 25B, and 26, the pinch rollers 970 and 972 are rotatably held in brackets 974 and 976 attached to the rocking distal end portions of the rockingly supported movable guides 966 and 968, respectively. The brackets 974 and 976 are always biased against their weights toward the paper feed rollers 902, 912, 918, and 924 by biasing springs 978 and 980, respectively. As a consequence, the pinch rollers 970 are always evenly and tightly urged against the outer circumferential surface of the front paper feed roller 902 (FIG. 25A), and the pinch rollers 972 are always evenly and tightly urged against the outer circumferential surfaces of the rear paper feed rollers 912, 918, and 924 (FIG. 25B).

In the above explanation, the L-, M-, and S-size roll sheets 101, 102, and 103 are set as an example. However, the same effect can be obtained even when the LL-size roll sheet 100 is set as illustrated in FIG. 28A.

An operation of feeding the sheets 100, 101, 102, and 103 from the paper feed station 1 to the recording station 2 will be described below with reference to FIG. 26. In the following explanation, an operation of feeding the sheets 101, 102, and 103 from the L-, M-, and S-size roll sheets 101, 102, and 103 set as shown in FIG. 21 will be described as an example.

First, the movable guide 966 is pushed down against the biasing force of the biasing spring 978, and the leading edge of the sheet 101 of the L-size roll sheet 101 is inserted and nipped between the front paper feed roller 902 and the pinch rollers 970. Also, the movable guide 968 is pushed down against the biasing force of the biasing spring 980, and the leading edges of the sheets 102 and 103 of the M- and S-size roll sheets 102 and 103 are inserted and nipped between the rear paper feed rollers 912, 918, and 924 and the pinch rollers 972.

When the image forming apparatus is driven by operating the operation panel 952 (FIG. 29) in this state, the rotational driving force of a platen roller 501 which is rotated by the motor 117 (FIG. 22) is transmitted to a desired one of the paper feed rollers 902, 912, 918, and 924. Consequently, the desired one of the paper feed rollers 902, 912, 918, and 924 is rotated to feed one of the sheets 101, 102, and 103 from the L-, M-, and S-size roll sheets 101, 102, and 103.

For example, the sheet 101 fed from the L-size roll sheet 101 is conveyed along the conveyance path (FIG. 26) formed between the fixed guide 122 and the movable guide 966 and smoothly guided to between pinch holders 209 and platen boards 502 by a thin plate member 207. The sheet 101 is then conveyed to the recording station 2.

On the other hand, the M- and S-size roll sheets 102 and 103 are independently or simultaneously controlled by the coupling mechanisms (FIGS. 23A and 23B) described previously. Accordingly, it is possible to independently or simultaneously feed the M- and S-size roll sheets 102 and 103. The sheets 102 and 103 fed from the M- and S-size roll sheets 102 and 103 are conveyed along the conveyance path (FIG. 26) formed between the fixed guide 121 and the movable guide 968 and smoothly guided to between the pinch holders 209 and the platen boards 502 by a conveyance guide 982. The sheets 102 and 103 are then conveyed to the recording station 2.

Sensors S1, S2, and S3 are arranged in these conveyance paths and detect the leading edges of the sheets 101, 102, and 103. The pinch holders 209 can be rotated a predetermined angle by a guide bar 208, and a driving pinch roller 507 is rotatably supported by the end portion of each pinch holder 209. By rotating the pinch holders 209 the driving pinch rollers 507 can be brought into contact with and separated from the platen roller 501.

An image recording operation of the recording station 2 will be described below with reference to FIG. 22. In the following explanation, only an operation of recording a desired image on the sheet 101 fed from the L-size roll sheet 101 will be described as an example, and image recording operations for the other sheets 102 and 103 will be omitted.

The sheet 101 conveyed to the recording station 2 is nipped between the platen roller 501 and the driving pinch rollers 507 and conveyed to an image recording area.

In the image recording area, a platen unit 5 is evacuated to a negative pressure by suction means 504. Consequently, the air is drawn by suction from a large number of holes 502b (FIG. 26) formed in the platen boards 502. These holes 502b are formed on the downstream side of the sheet conveyance direction T.

The sheet 101 pushed out by the platen roller 501 and the driving pinch rollers 507 is uniformly drawn to the platen boards 502 by suction. Consequently, the sheet 101 slides on the platen boards 502 as it is kept flat.

A carriage unit 4 (FIGS. 21 and 22) having an image recording unit 401 capable of ejecting ink components of four colors {black (K), cyan (C), magenta (M), and yellow (Y)} reciprocates in directions indicated by the arrows in FIG. 21 along linear guides 203 and 204. As a consequence, a desired image is recorded on the sheet 101. That is, each color ink is supplied from an ink cartridge 4a containing the ink to the image recording unit 401 via an ink tank 4b, forming a desired image on the sheet 101.

When the image recording as above is completed, the recorded sheet 101 is delivered to the processing station (not shown) by a pair of paper delivery rollers 206. The sheet 101 is cut into a desired size by a cutter 205 (FIG. 22). Note that the paper delivery rollers 206 are a driving roller 206a to be pressed against the non-recorded surface of a sheet and a driven roller 206b to be pressed against the recorded surface of the sheet. The paper delivery timing can be controlled by driving the driving roller 206a by a paper delivery motor 984 (FIG. 22).

Similar image recording is performed for the sheets 102 and 103 set on the rear side. The sheets 102 and 103 are then cut into respective desired sizes by the cutter 205 and delivered by the paper delivery rollers 206.

Figure 27A:
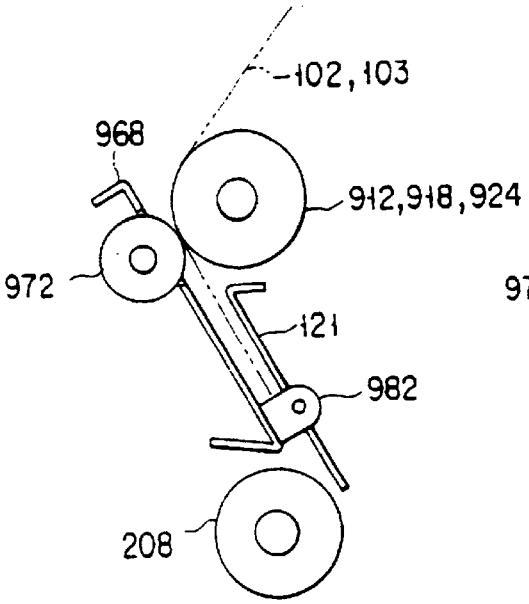
FIG. 27A is a view of the construction of a conveyance guide provided in the conveyance path, showing a state in which the conveyance guide is arranged on the conveyance path.
Figure 27B:
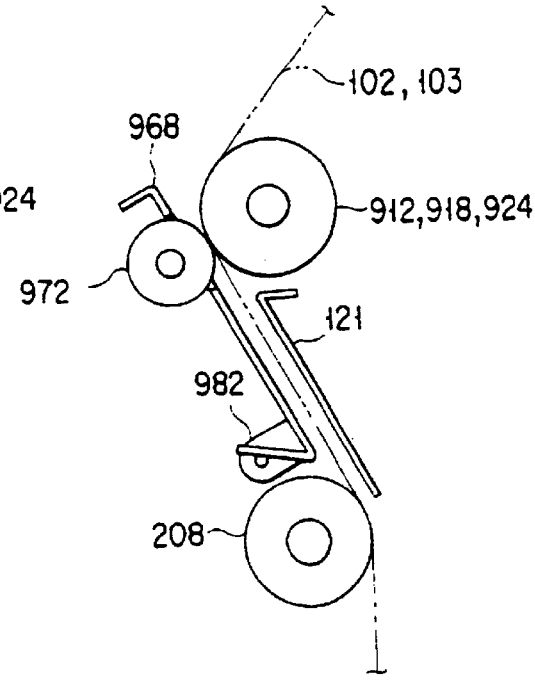
FIG. 27B is a view of the construction of the conveyance guide provided in the conveyance path, showing a state in which the conveyance guide is retracted from the conveyance path.

As shown in FIGS. 27A and 27B, when the sheets 102 and 103 set on the rear side are to be conveyed to the recording station 2, the conveyance guide 982 for guiding these sheets 102 and 103 is preferably arranged in a position (FIG. 28B) outside the conveyance path so that the conveyance guide 982 can smoothly guide the sheets fed from the roll sheets 100, 102, 102, and 103 different in the size.

In the above embodiment, the L-, M-, and S-size roll sheets 101, 102, and 103 are set as shown in FIGS. 21 and 28B. However, the present invention is not limited to this embodiment. For example, the roll sheets 100, 101, 102, and 103 can also be set as illustrated in FIG. 28A or 28C.

To set the LL-size roll sheets 100 on both the front and rear sides as shown in FIG. 28A, the flange 100a is fitted on the sleeve 902a of the front paper feed roller 902 and the other flange 10a is placed on the step portion 902b (FIG. 20). As a result, the LL-size roll sheet 100 is set on the front side. Also, the flange 100a is fitted on the sleeve 912a of the rear paper feed roller 912 and the other flange 100a is placed on the step portion 924b (FIG. 20) of the rear paper feed roller 924. Consequently, the LL-size roll sheet 100 is set on the rear side.

FIG. 28C shows an arrangement in which the LL- or L-size roll sheet 100 or 101 is set on the front side and three S-size roll sheets 103 are set on the rear side.

As has been described above, this embodiment can provide an image forming apparatus in which the roll sheets 100, 101, 102, and 103 of arbitrary sizes can be set in arbitrary positions in accordance with the use condition and the objective of use.

Figure 30:
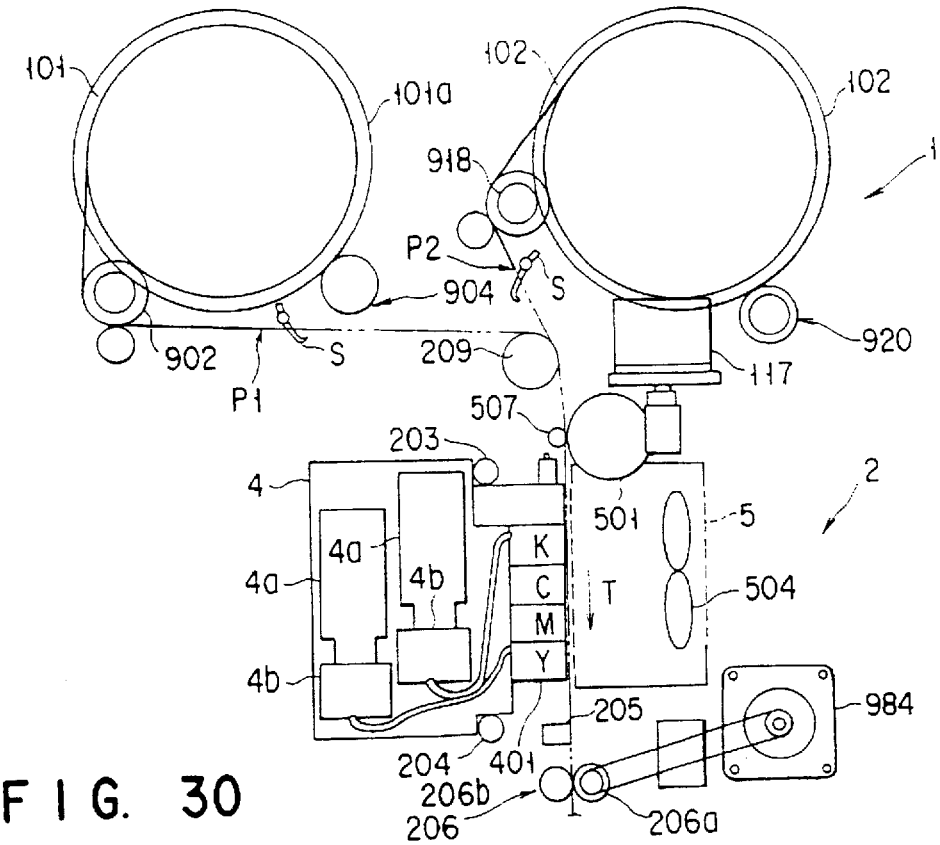
FIG. 30 is a diagram showing a sheet in the waiting position.

After the image-recorded portion is cut by the cutter 205, each sheet is rewound a predetermined amount to the corresponding sheet roll by the sensor S. FIG. 30 shows a standby state in which the sheets 101 and 102 are rewound a predetermined amount to the sheet rolls 101 and 102.

As can be apparent from this standby state, the sheets 101 and 102 are rewound such that the leading edges P1 and P2 of the sheets are positioned between the pinch holder 209 and the paper feed roller 902 and between the pinch holder 209 and the paper feed roller 918, respectively.

In this standby state, since the sheets 101 and 102 are kept in a state in which the [recorded surfaces] *recording sides* are curved *to face* outward, the sheets 101 and 102 in the standby state are curled outward. In the next image recording, the sheets 101 and 102 are fed from the sheet rolls 101 and 102 to the platen boards 502 in the outwardly curled state. The [image-recorded surfaces] *non-recording sides* of the sheets 101 and 102 are properly drawn to the platen boards 502 by suction without floating *away* from the platen boards 502. Since the sheets 101 and 102 are wound on the sheet rolls 101 and 102 such that the [non-recorded surfaces] *recording sides* of the sheets 101 and 102 face outward, the sheets 101 and 102 conveyed from the sheet rolls 101 and 102 to the platen [rollers] *boards* 502 are curled in a direction to facilitate tight contact with the platen surfaces.

Figure 31:
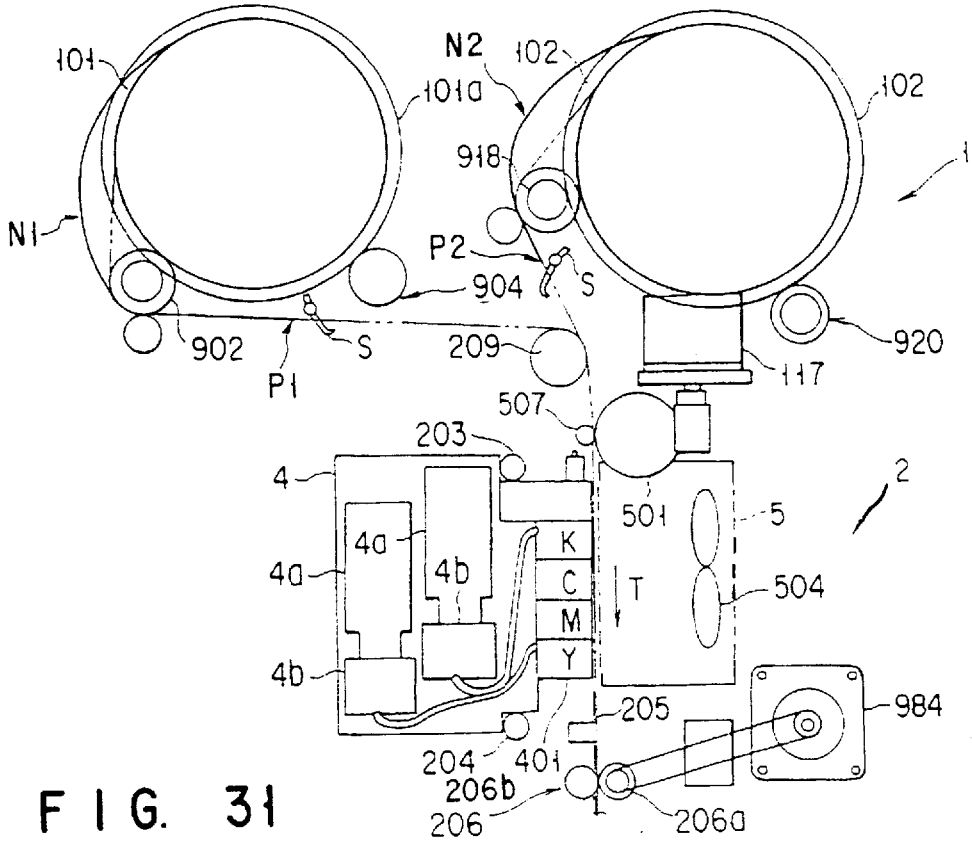
FIG. 31 is a diagram showing the sheet in another position.

In the first and second embodiments, it is preferable that the sheets 101 and 102 be rewound on the sheet rolls 101 and 102 to form slack portions N1 and N2, as shown in FIG. 31. In the above standby state, curling of the sheets 101 and 102 positioned on the paper feed rollers 902 and 918 can be moderated. In the next image recording, this improves tight contact of the sheets 101 and 102 with the platen boards 502.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus comprising first and second sheet roll holding units capable of simultaneously setting a plurality of sheet rolls formed by winding a plurality of sheets having different widths into rolls on an upper surface of said apparatus, wherein said first sheet roll holding unit rotatably holds a widest sheet roll of the plurality of sheet rolls, and said second sheet roll holding unit rotatably holds all others of the plurality of sheet rolls substantially in series with each other such that the sheet rolls held by said second sheet roll *holding unit* are parallel to the widest sheet roll held by said first sheet roll holding unit and at least partially overlap with said widest sheet roll in a sheet widthwise direction.

2. An apparatus according to claim 1, wherein said first sheet roll holding unit is arranged closer to an operation side of said image forming apparatus than said second sheet roll holding unit.

3. An apparatus according to claim 1, wherein a joint portion where the sheets fed from said first and second sheet roll holding units join is formed between said first and second sheet roll holding units, and a conveyance path extends from said joint portion so as to guide the sheets fed to said joint portion to an image recording unit for performing image formation processing.

4. An image forming apparatus comprising:

flanges detachably attached to both ends of a sheet roll formed by winding a sheet into a roll; and a roller on which said flanges can be placed so that the sheet roll is rotatably supported, wherein said roller controls rotation of the sheet roll so as to feed the sheet.

5. An apparatus according to claim 4, wherein said roller comprises a positioning portion which engages [with] *one of* said flanges of the sheet roll and positions the sheet roll in a direction of a width of the sheet roll.

6. An apparatus according to claim 4, wherein said roller comprises a paper feed roller for feeding a sheet fed from the sheet roll, and flange receivers formed in two ends of said paper feed roller.

7. An image forming apparatus for forming an image on a sheet fed from a sheet roll formed by winding a sheet into a roll, comprising:

a pair of conveyor rollers for pinching and conveying the sheet fed from the sheet roll; and a holding unit arranged in at least one of said conveyor rollers to position and hold the sheet roll.

8. An image forming apparatus for forming an image on a sheet having a downstream end portion by using a recording device, comprising:

a platen positioned opposite to said recording device, said platen having a [Plurality] *plurality* of small holes, and said platen being arranged to draw by suction and hold the sheet through said plurality of small holes; and a conveyor, arranged upstream of said small holes of said platen in a sheet conveyance direction, for pushing and conveying the sheet in the sheet conveyance direction, [and]

wherein said recording device starts recording of an image only when the downstream end portion of the sheet reaches the recording device.

9. An apparatus according to claim 8, wherein said conveyor conveys the sheet while contacting the sheet on substantially [a] *the* same level as said platen through openings formed in said platen.

[10. An image forming apparatus for forming an image on a sheet by using a recording device, comprising:

a platen positioned opposite to said recording device to draw by suction and hold the sheet through a plurality of small holes;

a conveyor, arranged upstream of said small holes of said platen in a sheet conveyance direction, for pushing and conveying the sheet in the sheet conveyance direction; and a sheet roll positioned upstream of said conveyor in the sheet conveyance direction, said sheet roll being arranged to wind the sheet such that a recorded surface of the sheet faces outward.]

11. An apparatus according to claim 8, further comprising a sheet guide path positioned upstream of said conveyor in the sheet conveyance direction, said sheet guide path being capable of holding the sheet with a recorded surface of the sheet facing outward in a non-recording mode.

12. An image forming apparatus comprising:

a stay fixed to a frame of a main body of said image forming apparatus;

a platen fixed to said stay;

a recording device for recording an image on a sheet conveyed on said platen; and a guide fixed to said frame to hold said recording device.

13. An apparatus according to claim 8, wherein said platen has a sheet conveying surface having a low friction coefficient.

14. An apparatus according to claim 12, wherein said platen has a sheet conveying surface having a low friction coefficient.

15. An apparatus according to claim 8, wherein said platen comprises a plurality of platens continuously arranged along a sheet widthwise direction.

16. An apparatus according to claim 12, wherein said platen comprises a plurality of platens continuously arranged along a sheet widthwise direction.

17. An apparatus according to claim 12, wherein said platen comprises a material having substantially [a] *the* same thermal expansion coefficient as said stay.

18. An image forming apparatus comprising:

a plurality of sheet roll holding units capable of holding a plurality of sheet rolls formed by winding a plurality of sheets into rolls;

guide paths extending from said sheet roll holding units and having a joint portion at which [sheets fed from said sheet rolls] *the guide paths* join;

a sheet conveyor, provided downstream of said joint portion of said guide paths, for pinching and conveying sheets passing through said joint portion by making an urging member act on said sheets; and a holding member for holding said urging member so that said urging member is brought into contact with [and] *or* separated from said sheet conveyor, said holding member having a guide surface which guides said sheets fed from said sheet rolls to said joint portion in a direction of said sheet conveyor.

19. An apparatus according to claim 18, wherein said holding member comprises a plurality of holders rockingly held by a bar-like support member, and wherein sleeves rotatably fitted on said support member are arranged between said holders.

20. An apparatus according to claim 18, wherein at least one of said guide paths extending from said sheet roll holding units includes an elastic member arranged in opposition to said guide surface of said holding member so as to urge said sheets passing through said joint portion.

21. An image forming apparatus for forming an image on a sheet conveyed along a sheet conveyance path, comprising:

a carriage for holding a recording device for recording an image on the sheet, said carriage moving said recording device in a direction crossing said sheet conveyance path when performing image recording and retracting said recording device from said sheet conveyance path when in a stand by mode;

a sheet sensor arranged on said carriage to detect information relating to the sheet prior to image recording; and a control device for controlling conveyance of the sheet and movement of said carriage, [and]

wherein said sheet sensor is arranged upstream of said recording device in a sheet conveyance direction and closer to said sheet conveyance path than a retracting position of said recording device, so as to oppose the sheet.

22. An apparatus according to claim 21, wherein said control device controls conveyance of the sheet based on an output from said sheet sensor.

23. An image forming apparatus comprising:

a feeding device for simultaneously feeding a plurality of sheets arranged at predetermined intervals in a sheet widthwise direction;

a recording device for forming images on the sheets; and a carriage for reciprocatingly moving said recording device in a direction crossing a sheet conveyance direction, wherein image formation is simultaneously performed by said recording device on all of the plurality of sheets during one recording movement of said carriage based on file information of images to be formed on the sheets.

24. An image forming apparatus comprising:

a feeding device for feeding a sheet to a recording unit;

a recording device for performing a recording operation to record an image on the sheet in said recording unit;

a carriage for reciprocating said recording device a distance not less than a width of the sheet in a direction perpendicular to a sheet conveyance direction;

a control device for controlling recording of the image onto the sheet by moving said carriage based on file information containing image recording information and cut position information and in synchronism with conveyance of the sheet; and a sheet cutting device for cutting the sheet on which the image is recorded, wherein when the sheet is not to be cut, the sheet is conveyed a length L (L>0) based on the image recording information and in synchronism with reciprocation of said carriage, and when the sheet is to be cut, the sheet is conveyed a length $\alpha$ ($0<\alpha,<L$) based on the cut position information, while the recording operation is temporarily stopped, so that a cut position of the sheet opposes said sheet cutting device, the sheet is cut and conveyed a length $L-\alpha$, and the recording operation is restarted.

25. An image forming apparatus comprising:

a feeding device for feeding a plurality of sheets to a recording unit;

a recording device for performing a recording operation to record images on the sheets in said recording unit;

a carriage for reciprocating said recording device a distance not less than a width of the sheets in a direction perpendicular to a sheet conveyance direction;

a control device for controlling recording of images onto the sheets by moving said carriage based on file information containing image recording information and cut position information and in synchronism with conveyance of the sheets; and a sheet cutting device for cutting the sheets on which the images are recorded, wherein when the sheets are not to be cut, the sheets are intermittently conveyed based on the image recording information and in synchronism with reciprocation of said carriage, and when a selected one of the sheets is to be cut, only the selected sheet is conveyed a predetermined length based on the cut position information, while the recording operation is temporarily stopped, so that only a cut position of the selected sheet opposes said sheet cutting [means] *device*, the selected sheet is cut, the sheets are conveyed a predetermined length, and the recording operation is restarted.

26. An apparatus according to claim 24, further comprising:

a movement control device for retracting said carriage to a standby position when a sheet is to be cut; and a protecting unit for covering said recording device in the standby position.

27. An apparatus according to claim 25, further comprising:

a movement control device for retracting said carriage to a standby position when a sheet is to be cut; and a protecting unit for covering said recording device in the standby position.

28. An image forming apparatus comprising:

a conveyor for conveying, in forward and backward directions, a sheet fed from a roll sheet formed by winding the sheet into a roll;

a recording device for recording an image on the sheet while said conveyor conveys the sheet in the forward and backward directions;

a sheet cutter for performing a cut operation to cut the sheet on which the image is recorded; and a suction device arranged to suck the sheet toward a platen located to face the recording device by applying a negative pressure to the sheet, and to remove dust produced in said apparatus during and after the cut operation.

29. An image forming apparatus having an upper surface, the image forming apparatus comprising:

a roll support mechanism for setting a plurality of sheet rolls formed by winding sheets into rolls on said upper surface of said apparatus, wherein said roll support mechanism comprises a plurality of roll support portions arranged substantially linearly in a direction of a width of the sheet, and said sheet roll is placed across arbitrary ones of said plurality of roll support portions to allow a sheet roll having an arbitrary width to be set to an arbitrary position on an array line of said roll support portions.

30. An apparatus according to claim 29, wherein each of said roll support portions comprises a paper feed roller for rotating the sheet roll, and a support roller device for rotatably supporting the sheet roll.

31. An apparatus according to claim 30, wherein said support roller device comprises a support roller mechanism capable of rotatably supporting a first end of the sheet roll and controlling rotation of the sheet roll, and a support roller for rotatably supporting a second end of the sheet roll.

32. An apparatus according to claim 31, wherein said support roller mechanism comprises a support roller for rotatably supporting one end of the sheet roll to control a rewind of the sheet roll, a reverse motor for controlling rotation of said support roller, and a clutch capable of transmitting a driving force of said reverse motor to said support roller.

33. An apparatus according to claim 30, further comprising a coupling mechanism for [one of] simultaneously and selectively rotating said paper feed rollers of said plurality of roll support portions independently of each other.

34. An apparatus according to claim 30, wherein said coupling mechanism comprises a detecting circuit capable of detecting set positions and set conditions of the sheet rolls, and said image forming apparatus further comprises a display for displaying the set positions and the set conditions of the sheet rolls based on an output detection signal from said detection circuit.

35. An apparatus according to claim 29, further comprising a conveyance guide for guiding the sheet in a predetermined direction when the sheet roll supported by said roll support mechanism is [at least one of] fed and rewound, said conveyance guide being arranged in a position outside a conveyance path of the sheet.

*36. An image forming apparatus comprising first and second sheet roll holding units setting a first sheet roll and at least one second sheet roll formed by winding a plurality of sheets on an upper side of said apparatus,*

*said first sheet roll holding unit rotatably holding the first sheet roll, and said second sheet roll holding unit rotatably holding the second sheet roll such that the second sheet roll held by said second sheet roll holding unit is parallel to the first sheet roll held by said first sheet roll holding unit and at least partially overlap with said first sheet roll in a sheet widthwise direction.*

*37. An apparatus according to claim 36 wherein said first sheet roll and second sheet roll have different widths, respectively.*

*38. An image forming apparatus comprising:*

*a recording device for recording an image on a sheet having a downstream end portion;*

*a platen having a plurality of holes through which the sheet is drawn and held by suction of the sheet on the platen when the image is recorded on the sheet by the recording device; and*

*a conveyor arranged upstream of the holes of said platen in a sheet conveyance direction, for pushing and conveying the sheet in the sheet conveyance direction,*

*wherein said recording device starts recording of the image when the downstream end portion of the sheet reaches the recording device.*

*39. An image forming apparatus comprising:*

*a recording device for recording an image on a sheet;*

*a platen having a holding part and a plurality of holes through which the sheet is drawn and held by suction of the sheet on the platen when the image is recorded on a part of the sheet between the holding part and the recording device, by the recording device;*

*a first conveyor arranged upstream of the holding part of said platen in a sheet conveyance direction, for pushing and conveying the sheet in the sheet conveyance direction; and*

*a second conveyor arranged downstream of the holding part of said platen in a sheet conveyance direction for conveying the sheet in the sheet conveyance direction,*

*wherein said recording device starts recording of the image on the part of the sheet between the holding part and the recording device, before the sheet conveyed by the first conveyor in the sheet conveying direction reaches the second conveyor.*

*40. An image forming apparatus comprising:*

*a recording device for recording an image on a sheet;*

*a platen having a plurality of holes through which the sheet is drawn and held by suction of the sheet on the platen when the image is recorded on the sheet by the recording device;*

*a conveyor arranged upstream of the holes of said platen in a sheet conveyance direction, for conveying the sheet in the sheet conveyance direction; and*

*a sheet roll positioned upstream of said conveyor in the sheet conveyance direction, said sheet roll being arranged to wind the sheet such that a recording side of the sheet faces outward in a roll state.*

*41. An apparatus according to claim 40 wherein said conveyor includes a pinch roller and a platen roller for pinching the sheet therebetween and conveying the sheet to the recording device; and*

*a swingable pinch holder for rotatably supporting the pinch roller, the pinch holder having an arcuated surface on which the sheet is slid and along which the sheet is guided so that the sheet is bent in an opposite direction from a rolled direction of the sheet roll.*

*42. An apparatus according to claim 41 wherein said pinch holder is selectively swung to allow the pinch roller to be in contact with the sheet or to be apart from the sheet.*

*43. An apparatus according to claim 41 wherein the arcuated surface of said pinch holder is positioned upstream of the pinch roller in the sheet conveyance direction.*

*44. An image forming apparatus comprising:*

*a recording device for recording an image on a sheet;*

*a conveyor for conveying, in forward and backward directions, the sheet fed from a roll sheet formed by winding the sheet into a roll;*

*a sheet cutter for performing a cut operation to cut the sheet on which the image is recorded; and*

*a platen including a suction chamber having a platen board, and a suction device for creating a negative pressure in the suction chamber to suck the sheet toward the platen board by applying a negative pressure to the sheet through the platen board, and to suck dust produced in the image forming apparatus into the suction chamber during and after the cut operation.*

*45. An apparatus according to claim 44 wherein said sheet cutter includes a fixed blade extending in a sheet widthwise direction and a movable blade which is moved along the fixed blade to cut the sheet between the fixed and movable blades.*

*46. An apparatus according to claim 44 wherein said suction chamber includes a stay on which said sheet cutter is attached.*

*47. An apparatus according to claim 44 which comprises a pair of paper delivery rollers arranged downstream of the sheet cutter and conveying the sheet with the sheet pinched between the delivery rollers, wherein when the sheet is cut by the sheet cutter, a portion of the sheet upstream of a cut portion is drawn by the suction device and held to the platen board by the suction force, and a downstream portion of the sheet is pinched between the delivery rollers.*

*48. An apparatus according to claim 44 which comprises a carriage which is moved in a sheet widthwise direction for reciprocating the recording device a distance not less than a width of the sheet in the sheet widthwise direction; and*

*a control device for controlling recording of the image onto the sheet by moving said carriage based on file information containing image recording information and cut position information and in synchronism with conveyance of the sheet,*

*wherein while the recording operation is temporarily stopped, the sheet is conveyed a predetermined length based on the cut position information so that only a cut position of the sheet opposes said sheet cutter, the sheet is cut at the cut position, the sheet is conveyed a predetermined length, and then the recording operation is restarted.*

*49. An image forming apparatus comprising:*

*a recording device having a recording area in which an image is recorded on a sheet fed from a sheet roll formed by winding the sheet;*

*a sheet cutter for performing a cutting operation of the sheet on which the image has be recorded; and*

*a platen including a suction device for sucking the sheet toward the platen by a suction force and for sucking to remove dust generated in the image forming apparatus by the cutting operation.*

*50. An apparatus according to claim 49 wherein said sheet cutter is disposed downstream of the recording area of the recording device in a sheet conveyance direction.*

*51. An apparatus according to claim 49 which comprises a conveyor for conveying the sheet in a direction opposite to the sheet conveyance direction, and wherein said suction device is operative for sucking the sheet toward the platen while the sheet is conveyed in the direction opposite to the sheet conveyance direction by the conveyor.*

* * * * *